Figure 1:
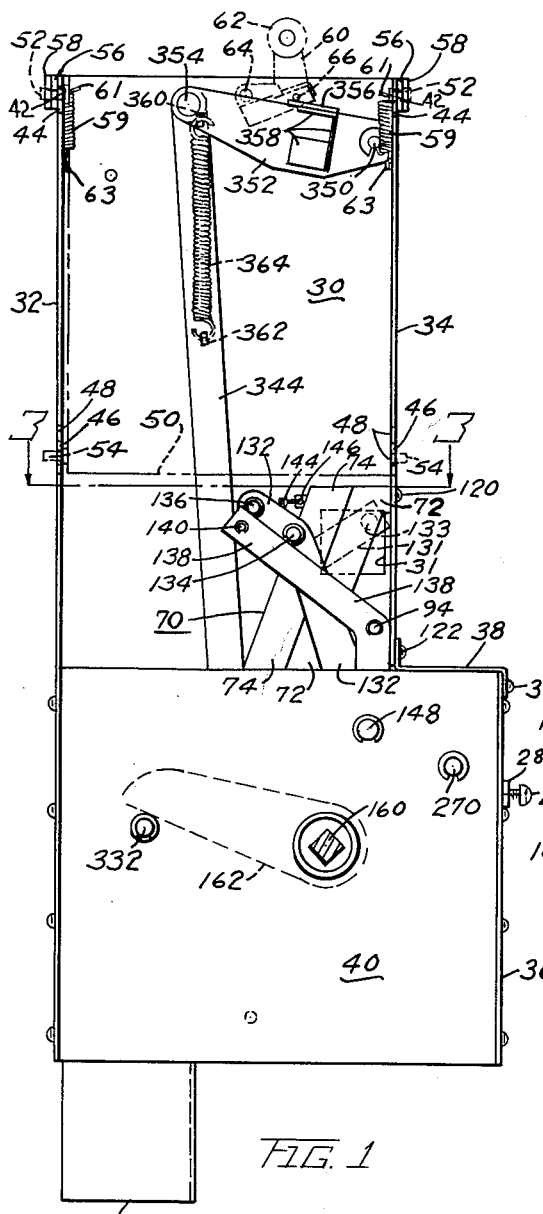

Dec. 1, 1964     F. T. VACCARO ETAL     3,159,262

MONEY-HANDLING DEVICES

Filed March 8, 1961     10 Sheets-Sheet 1

INVENTORS
FRANCIS T. VACCARO
JULES N. J. BOISVERT

BY    Rey Eilers
ATTORNEY.

Dec. 1, 1964   F. T. VACCARO ETAL   3,159,262
MONEY-HANDLING DEVICES

Filed March 8, 1961   10 Sheets-Sheet 2

INVENTORS
FRANCIS T. VACCARO
JULES N.J. BOISVERT
BY
ATTORNEY.

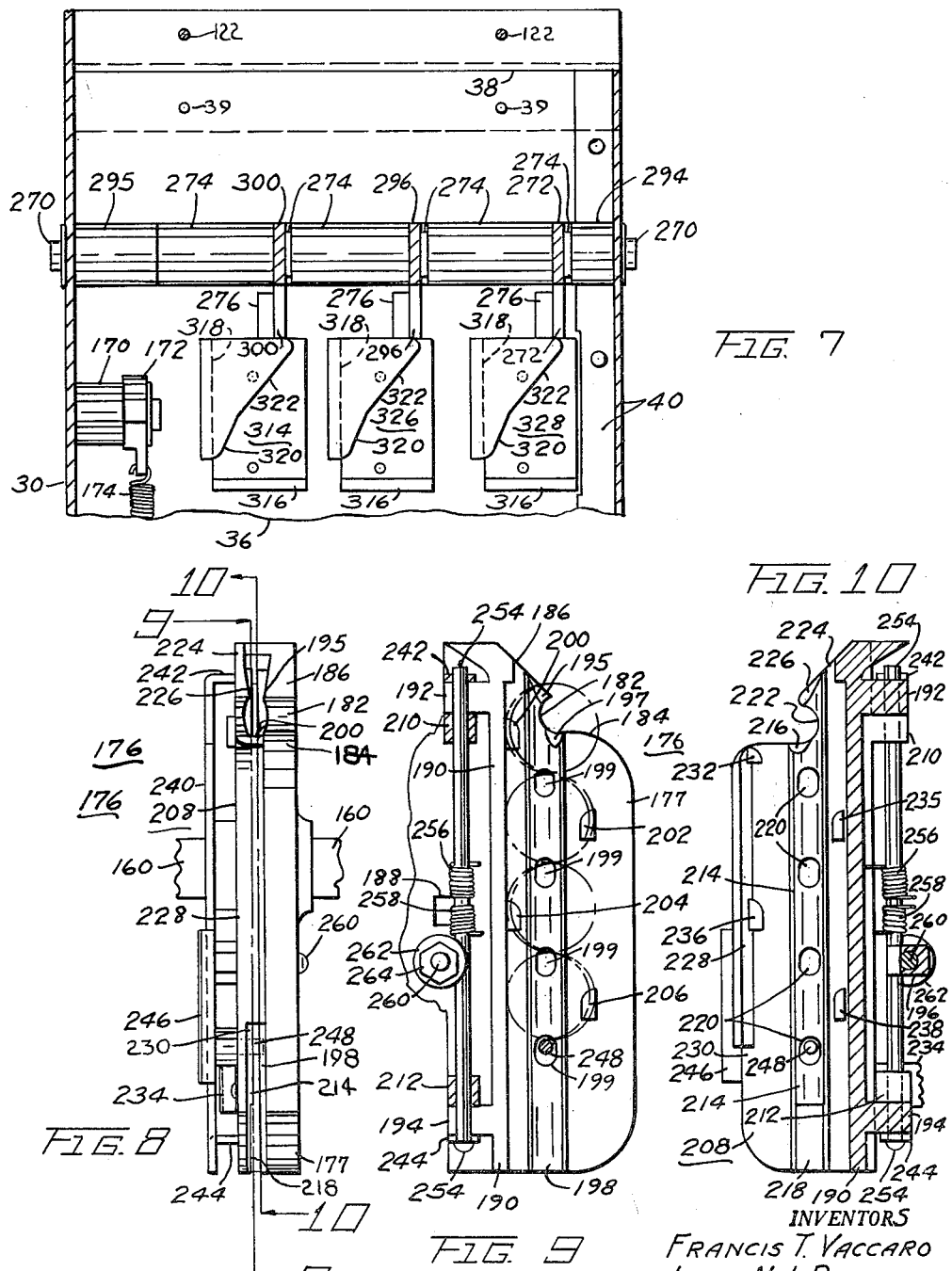

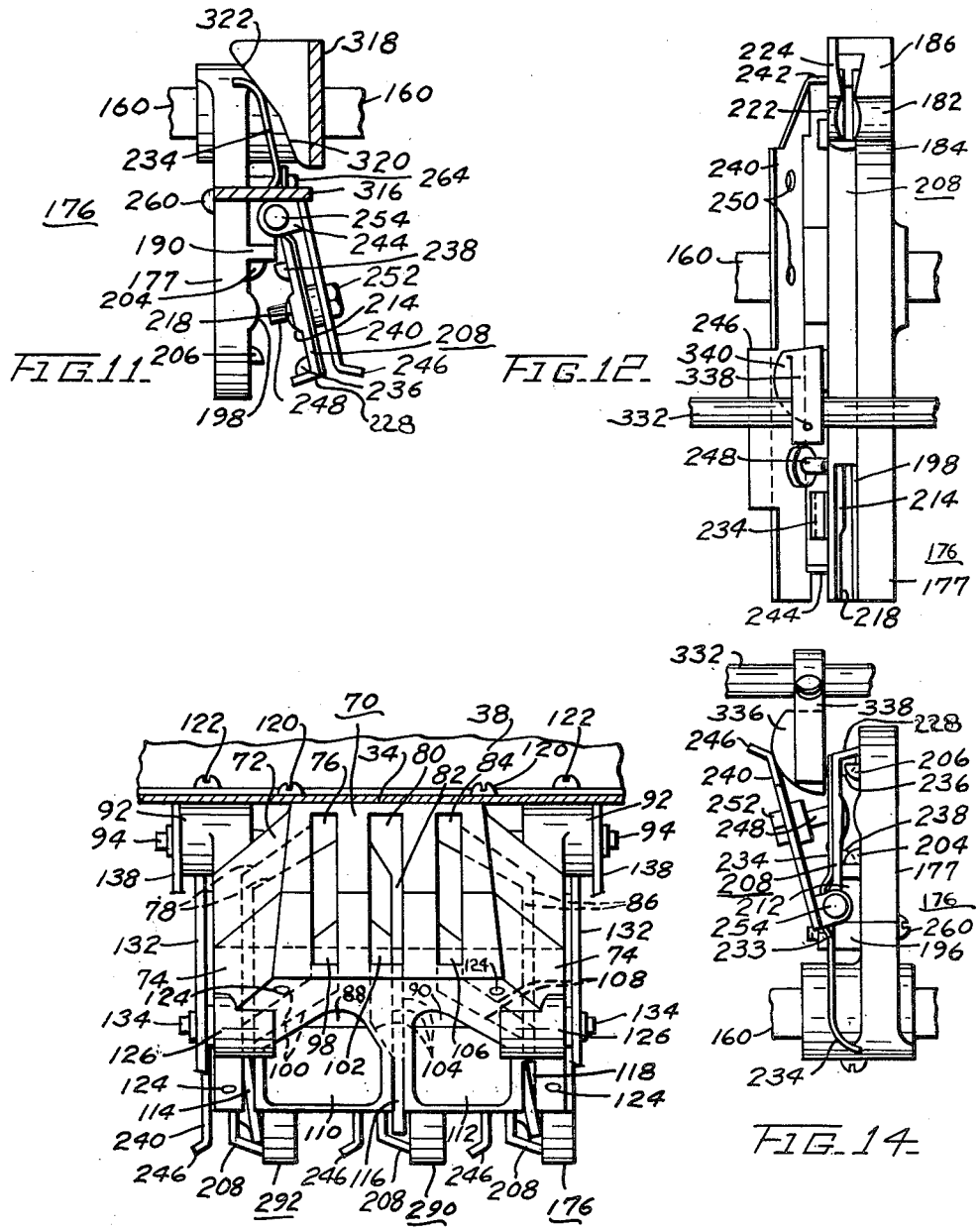

Dec. 1, 1964   F. T. VACCARO ETAL   3,159,262
MONEY-HANDLING DEVICES
Filed March 8, 1961   10 Sheets-Sheet 7

INVENTORS
FRANCIS T. VACCARO
JULES N. J. BOISVERT
BY
ATTORNEY.

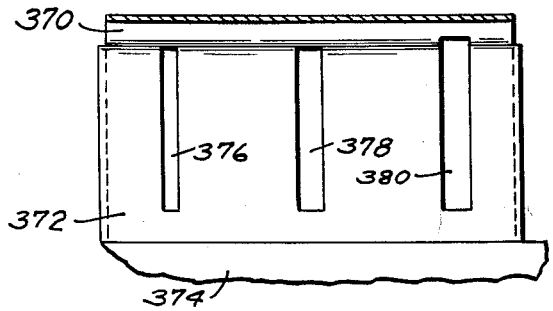
FIG. 17.
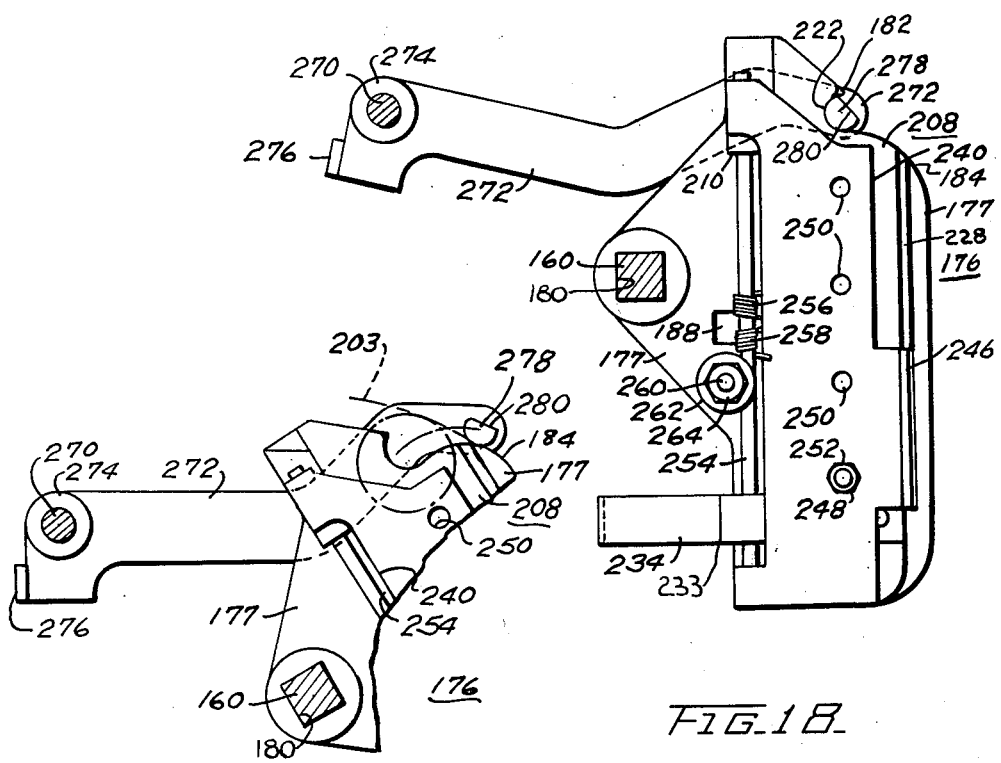
FIG. 18.
FIG. 19.
INVENTORS
FRANCIS T. VACCARO
JULES N. J. BOISVERT
BY
ATTORNEY.

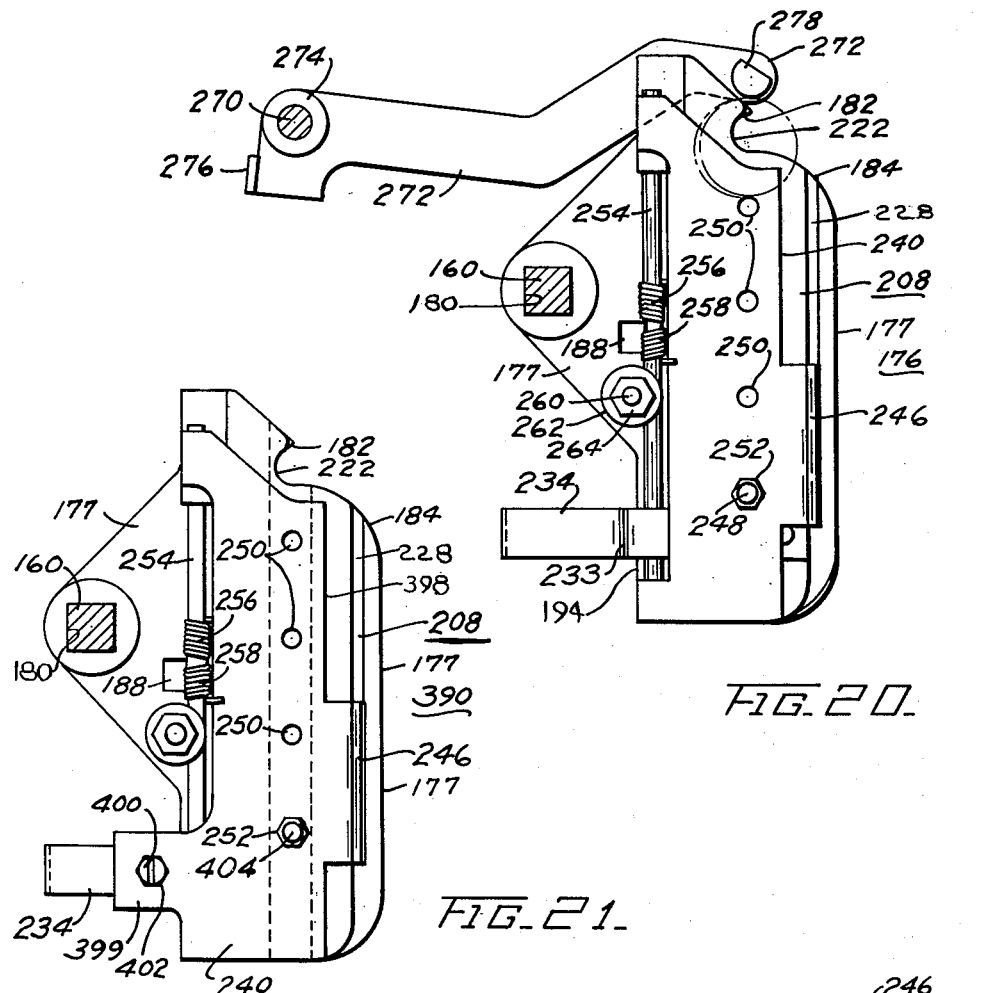
FIG. 20.
FIG. 21.
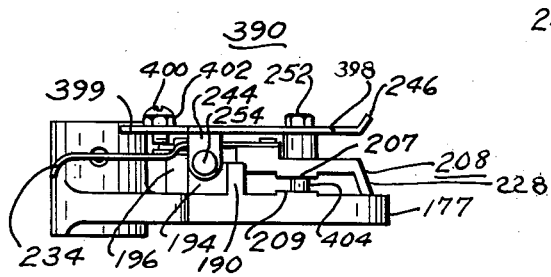
FIG. 22.
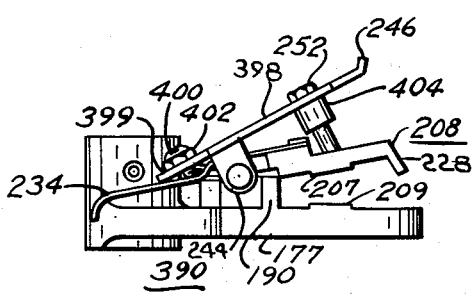
FIG. 23.
INVENTORS
FRANCIS T. VACCARO
JULES N. J. BOISVERT
ATTORNEY.

Dec. 1, 1964 F. T. VACCARO ETAL 3,159,262
MONEY-HANDLING DEVICES
Filed March 8, 1961 10 Sheets-Sheet 10

INVENTORS
FRANCIS T. VACCARO
JULES N. J. BOISVERT
BY
ATTORNEY.

United States Patent Office 3,159,262
Patented Dec. 1, 1964

3,159,262
MONEY-HANDLING DEVICES
Francis T. Vaccaro, Pagedale, and Jules N. J. Boisvert, Ferguson, Mo., assignors to National Rejectors, Inc., St. Louis, Mo., a corporation of Missouri
Filed Mar. 8, 1961, Ser. No. 94,274
18 Claims. (Cl. 194—61)

This invention relates to improvements in money-handling devices. More particularly, this invention relates to improvements in actuating devices that require a predetermined, multiple number of coins to be inserted before those devices can provide a desired actuation.

It is, therefore, an object of the present invention to provide an improved actuating device that requires a predetermined, multiple number of coins to be inserted before that device can provide a desired actuation.

It is frequently desirable to use vending machines which are manually operable and which can be operated only after a predetermined, multiple number of coins has been inserted. It would, therefore, be desirable to provide an actuating device for a manually operable vending machine, and to make that device so it could actuate that vending machine only after a predeterimned, multiple number of coins were inserted. Further, it would be desirable to make that actuating device so it could promptly and effectively release all of the inserted coins, for movement to the cash box of the vending machine, during each actuating cycle of that device. Prompt releasing of all of the inserted coins would be desirable because it would keep a patron from trapping a coin or coins by restoring the parts of the actuating device to their normal positions with great rapidity. Effective releasing of all of the coins would be desirable because it would keep a bent or sticky coin from remaining within the actuating device. The present invention provides prompt and effective releasing of all of the inserted coins, despite the restoration of the parts of the actuating device to their normal positions with great rapidity, by equipping the actuating device with coin carriers that are openable to permit the inserted coins to fall in broadside-fashion from those coin carriers. As a result, all delays that could result from the sequential release of the coins from the coin carriers are avoided. Further, all of the inserted coins will fall from the coin carriers even if some of those coins are bent or sticky. It is, therefore, an object of the present invention to provide an actuating device with coin carriers which permit the inserted coins to fall in broadside-fashion from those coin carriers.

The coin carriers of the actuating device provided by the present invention are normally disposed so they are generally vertical. This is desirable because it facilitates the ready acceptance and holding of predetermined, multiple number of coins by those coin cariers. Those coin carriers are subsequently rotatable until they are generally horizontal; and that is desirable because it facilitates the releasing of the coins, in broadside-fashion, for movement to the cash box of the vending machine. It is, therefore, an object of the present invention to provide an actuating device with coin carriers that are normally disposed so they are generally vertical but that can be rotated until they are generally horizontal.

As the coin carriers, of the actuating device provided by the present invention, approach their generally horizontal position, leaf springs on the "gates" of those coin carriers engage camming surfaces and cause those gates to rotate to coin-freeing position. Those leaf springs are desirable because they will absorb any unusually sudden and heavy forces that would otherwise be transmitted to the coin carriers when a patron applied sudden and heavy forces to the handle of the actuating device. It is, therefore, an object of the present invention to provide leaf springs on the gates of the coin cariers, of the actuating device provided by the present invention, and to cause those leaf springs to engage camming surfaces and cause those gates to rotate to coin-freeing position as those coin carriers approach their generally horizontal position.

It would also be desirable to make an actuating device, which requires the insertion of a predetermined, multiple number of coins before it can provide a desired actuation, so the requisite number of coins can be readily changed. Where that is done, different sales prices can easily be set for the various products to be vended. The present invention makes it possible to readily change the requisite number of coins; and it does so by providing the coin carirers with coin-supporting elements which can be set at different distances from the inlet ends of those carriers. By setting those coin-supporting elements close to those inlet ends, it is possible to reduce the requisite number of coins; and by setting those coin-supporting elements close to the outlet ends of the coin carriers, it is possible to increase the requisite number of coins. It is, therefore, an object of the present invention to provide an actuating device which has coin carriers that are equipped with coin-supporting members that can be set at different distances from the inlet ends of those carriers.

It would be desirable to make the actuating device provided by the present invention so patrons could retrieve the coins which they insert, in the event those patrons change their minds after inserting the coins and decide they do not want the products or services which they sought when they inserted the coins. The present invention does this by making the coin-supporting members movable relative to the coin carriers. Specifically, the present invention makes the coin-supporting members movable relative to the coin carriers so those coin-supporting members can be moved out of coin-supporting position; and as those coin-supporting members so move they will permit the inserted coins to pass to a coin receptacle at the exterior of the vending machine. It is, therefore, an object of the present invention to make the coin-supporting members of an actuating device movable relative to the coin carriers of that device so those coin-supporting members can be moved out of coin-supporting position.

The actuating device provided by the present invention is made so the coin-supporting members of that actuating device can be moved out of coin-supporting position only when the coin carriers of that actuating device are in, or close to, their normal positions. This means that a patron can change her mind and can retrieve all of the coins she inserted as long as the coin carriers are in, or close to, their normal positions; but that such patron can not retrieve any of the coins she inserted if she changes her mind after she has rotated the coin carriers far enough to initiate a vending cycle of the vending machine. In this way, each patron is given a full and complete opportunity to change her mind before the vending cycle of the vending machine is initiated; and yet the operator of the vending machine is protected against the losses which would result if the inserted coins could be retrieved by a patron after a vending cycle of the vending machine had been initiated.

The present invention makes it possible for a patron to retrieve all of the coins she inserted as long as the coin carriers are in, or close to, their normal positions and yet keeps such patron from retrieving any of the coins she inserted after she has rotated the coin carriers far enough to initiate a vending cycle of the vending machine by providing retrieving cams which can move the coin-supporting members of the coin carriers out of coin-supporting position only as long as the coin carriers are in, or close to, their normal positions. Those retrieving cams will be freely movable even after the coin carriers have been rotated far enough to initiate a vending cycle of the vending machine; but those coin carriers will, at such time, be out of the paths of movement of those retrieving cams. Such an arrangement is desirable because it keeps a patron from applying destructive forces to the scavenging system, as he might do if a latching arrangement were to be relied upon to prevent the retrieving of the inserted coins after the coin carriers have been rotated far enough to initiate a vending cycle of the vending machine. It is, therefore, an object of the present invention to provide coin carriers which can have the coin-supporting members thereof moved out of coin-supporting position by retrieving cams as long as those coin carirers are in, or close to, their normal positions, but that will be out of the paths of movement of those retrieving cams after they have been rotated far enough to initiate a vending cycle of the vending machine.

The coin-supporting members of the coin carriers provided by the present invention are preferably pins which have diameters that are materially smaller than the diameters of the coins to be held by those coin carriers. Such coin-supporting members facilitate ready and free egress, from the coin carriers, of dirt and other foreign matter which otherwise could be retained within those coin carriers. The retention of any such dirt or other foreign matter would be objectionable because it could interfere with the prompt and effective releasing of the inserted coins from the coin carriers. It is, therefore, an object of the present invention to provide small diameter pins that serve as the article-supporting members for the coin carriers of an actuating device.

The coin-supporting members of the coin carriers provided by the present invention normally extend into the coin-receiving recesses of those coin carriers through openings in the gates of those coin carriers. Those coin-supporting members are supported on plates that are rotatable relative to those gates; and rotation of those plates relative to those gates can withdraw those coin-supporting members from those recesses. Moreover, continued rotation of those plates can cause the gates themselves to rotate; and the rotation of those gates will facilitate effective releasing of all of the inserted coins from the coin carriers. It is, therefore, an object of the present invention to provide plates which support the coin-supporting members of the coin carriers of an actuating device, and which can be moved to withdraw those coin-supporting members from the coin-receiving recesses in those coin carriers and which can be moved even further to rotate the gates of those coin carriers.

The retrieving cams of the actuating device provided by the present invention are normally disposed adjacent the coin carriers of that device; and those cams have camming faces which are immediately adjacent the plates that support the coin-supporting members and have stop-like faces which are immediately adjacent the gates of those coin carriers. Those camming faces are engageable with those plates to effect movement of the coin-supporting members out of the coin-receiving recesses within the coin carriers; and those stop-like faces can limit rotation of the gates relative to the coin carriers and thereby prevent undesired releasing of the inserted coins from those coin carriers. Specifically, if the gates were to tend to rotate relative to the coin carriers, and thus release the inserted coins, as a patron applied sudden and heavy forces to the handle of the actuating device, that rotation would be prevented by the immediate engagement of those gates with the adjacent stop-like faces on the retrieving cams. As a result, the retrieving cams will keep a patron from causing the gates of the coin carriers to prematurely rotate relative to those coin carriers.

The coin carriers provided by the present invention have elongated, longitudinally-extending ribs at the inner faces thereof. Those ribs are disposed so they will be in register with the centers of coins held within the coin carriers, and so they will be spaced from the front and rear edges of those coins. This arrangement is desirable because it enables those ribs to hold the tops and bottoms of the coins, in any given coin carrier, in vertical alinement; and such alinement makes it possible for the coins to be held in vertically stacked array. This arrangement is also desirable because it provides ample space within the coin-receiving recesses of the coin carriers for the front and rear edges of the inserted coins. It is, therefore, an object of the present invention to provide longitudinally-extending ribs at the inner faces of coin carriers and to dispose those ribs in register with the centers of the coins held within those coin carriers.

Small bosses can be provided at the inner faces of the coin carriers; and those bosses can, by themselves, or in conjunction with the longitudinally-extending ribs, cause the inserted coins to assume positions wherein the planes of those coins are inclined relative to the gates of those coin carriers. Further, those bosses can be staggered to cause each coin to have an inclination that is opposite to the inclination of each contiguous coin. The overall result is that the bosses can, by themselves or in conjunction with the longitudinally-extending ribs, force the inserted coins to stand in vertically-stacked array and thereby keep those coins from slipping down into side-by-side engagement with each other. It is, therefore, an object of the present invention to provide bosses at the inner faces of the coin carriers of an actuating device which can, by themselves or in conjunction with longitudinally-extending ribs at those inner faces, force the inserted coins to stand in vertically-stacked array and thereby keep those coins from slipping down into side-by-side engagement with each other.

The small bosses at the inner faces of the coin carriers have smoothly-rounded, coin-guiding upper faces but have abrupt, coin-blocking lower faces. The smoothly-rounded, coin-guiding upper faces of those small bosses facilitate the movement of the inserted coins into and out of inclined position as those coins move downwardly through the coin carriers; and hence those upper faces prevent jamming of the inserted coins as those coins move downwardly through the coin carriers. However, the abrupt coin-blocking lower faces of those small bosses are intended to, and do, block upward movement of the inserted coins relative to the coin carriers. This is desirable because it prevents any and all movement of the inserted coins upwardly of the coin carriers, irrespective of whether a pull on a string or thread attached to those coins or the application of sudden and heavy forces to the handle of the actauting device tends to cause such movement. It is, therefore, an object of the present invention to provide small bosses at the inner faces of coin carriers which have smoothly-rounded, coin-guiding upper faces and which have abrupt, coin-blocking lower faces.

In the actuating device provided by the present invention, stops are mounted on locking levers; and those stops can, until the requisite number of coins is inserted, enter recesses in the coin carriers of that actuating device and keep those coin carriers from rotating far enough to initiate a vending cycle of the vending machine. However, when the requisite number of coins is inserted, the uppermost coins in the coin carriers will be interposed between those recesses and those stops and will serve to cam those stops upwardly and out of register with those recesses. The stops will normally rest upon convex edges of the coin carriers which are contiguous with the lower portions of the recesses; and the distance between those convex edges and the shaft on which the coin carriers are mounted is greater than the distance between those recesses and that shaft. This is desirable because it means that the stops will move inwardly toward that shaft, and thus toward locking position, rather than outwardly away from that shaft, and thus toward unlocking position, as those stops move into engagement with those recesses. As a result, a patron will be unable to effect outward and unlocking movement of the stops merely by applying sudden and heavy forces to the handle of the actuating device. It is, therefore, an object of the present invention to provide the coin carriers of an actuating device with recesses that are closer to the shaft on which those coin carriers are mounted than are those edges of those coin carriers on which the stops of the locking levers normally rest.

The coin carriers are dimensioned so the upper parts of the peripheries of the uppermost coins carried by those coin carriers will be spaced from the shaft on which those coin carriers are mounted distances which are close to the distances between that shaft and those edges of those coin carriers on which the stops of the locking levers normally rest. Where this is done, the force that is required to cause the stops on the locking levers to move outwardly beyond the recesses are small. As a result, a plurality of coin carriers can be mounted on one shaft and can have the coins carried thereby move the locking levers to unlocking position without requiring undue forces to be applied to the handle of the actuating device. It is, therefore, an object of the present invention to dimension the coin carriers of an actuating device so the upper parts of the peripheries of the uppermost coins carried by those coin carriers will be spaced from the shaft on which those coin carriers are mounted distances which are close to the distances between that shaft and those edges of those coin carriers on which the stops of the locking levers normally rest.

Whenever desired, the locking levers of the actuating device can be rotated to, and held in, a position where they can not block rotation of the coin carriers. This is desirable because some sales prices do not require the insertion of at least one coin of each of the denominations of coins that can normally be accepted by the actuating device. Set screws are mounted on the frame of the actuating device so the heads of those screws are readily accessible, and it is only necessary to rotate one or more of those set screws to move one or more of the locking levers to the position wherein the corresponding coin carrier or coin carriers can freely move to fully rotated position. This is desirable because it permits quick and simple setting of the sales price of the product to be vended by the vending machine.

It would be undesirable to permit coins that were inserted in the actuating device, of the present invention, after the coin carriers of that device had started rotating toward fully rotated position to be accepted by that actuating device. Any such acceptance could keep a patron from being fully accredited with the value of all of the coins inserted by her. The present invention keeps all such coins from being accepted by providing a coin-deflecting member which moves into position to intercept such coins and to deflect them toward the chute that will direct them to the coin cup at the exterior of the vending machine. That coin-deflecting member will move into coin-intercepting and coin-deflecting position as soon as the coin carriers move; and that member will remain in coin-intercepting and coin-deflecting position until those coin carriers return to their normal positions. That member is immediately adjacent the inlet ends of the coin carriers and will thus intercept and deflect any coins which might happen to be within, and moving downwardly through, the slug rejector, used with the actuating device, as the coin carriers start to move toward fully rotated position. It is, therefore, an object of the presnt invention to provide a coin-intercepting and coin-deflecting member which is mounted immediately adjacent the inlet ends of the coin carriers of an actuating device and which moves into coin-intercepting and coin-deflecting position as those coin carriers start rotating toward fully rotated position.

A pivoted member is mounted adjacent the coin-intercepting and coin-deflecting member, provided by the actuating device of the present invention; and the coin carriers normally engage that pivoted member and hold it in a position where it causes the coin-intercepting and coin-deflecting member to be out of coin-intercepting and coin-deflecting position. However, when the coin carriers start rotating toward fully rotated position, that pivoted member will move far enough to permit that coin-intercepting and coin-deflecting member to move into coin-intercepting and coin-deflecting position. As those coin carriers return to their normal position, they will engage the pivoted member and force that member against yieldable elements which will cushion the halting of the returning movement of those coin carriers. Just before that pivoted member engages those yieldable elements, it will cause the coin-intercepting and coin-deflecting member to return to its normal position. In this way, the coin-intercepting and coin-deflecting bar is permitted to intercept and deflect all coins which are moving toward the coin carriers at times when those coin carriers are not in their normal position.

The coin-intercepting and coin-deflecting member, provided for the actuating device of the present invention, also can be moved to coin-intercepting and coin-deflecting position by the "empty" mechanism of the vending machine. As a result, the coin-intercepting and coin-deflecting member performs the dual functions of returning inserted coins whenever the coin carriers are out of their normal position and of returning inserted coins whenever the vending machine is empty.

When the coin-receiving recess of any of the coin carriers, of the actuating device provided by the present invention, has received all of the coins which it can accommodate, any further coins that are directed toward that coin-receiving recess will strike the uppermost coin in that recess and be prevented from entering that coin-receiving recess. Those further coins will bound off of that uppermost coin and fall into a returned coin chute which will conduct those further coins to the coin cup at the exterior of the vending machine. In this way, if a patron inserts too many coins of one denomination, the excess coins will be automatically directed to the coin cup at the exterior of the vending machine. It is, therefore, an object of the present invention to provide an actuating device wherein excess coins of any denomination will be automatically directed to the coin cup at the exterior of the vending machine.

The stops on the locking levers of the actuating device provided by the present invention have flat areas on their upper faces. Those flat areas enable any excess inserted coins to pass freely over those stops as those coins bound off of the uppermost coins held by the coin carriers. In this way, any excess inserted coins will be automatically and effectively directed to the coin cup at the exterior of the vending machine.

The actuating device provided by the present invention has a coin block with chutes that direct inserted coins toward the inlet ends of the coin carriers. Exit openings are provided in that coin block adjacent the lower ends of, and contiguous with, those chutes; and those exit openings are large enough to permit excess inserted coins to pass freely through them as those excess inserted coins bound from the uppermost coins held by the coin carriers. Yet those exit openings are laterally displaced from the inlet ends of the coin carriers so that the coins which should enter those inlet ends of the coin carriers will not pass through those exit openings but will, instead, enter those inlet ends of the coin carriers. In addition, the lower ends of those chutes have curved portions which give all of the coins passing downwardly through those chutes a horizontal component of motion that will start those coins moving toward those exit openings. That horizontal component of motion will be great enough to make certain that all excess inserted coins will bound through those exit openings, but will be small enough to enable all of the coins which should enter the inlet ends of the coin carriers to fall short of those exit openings, and thus enter those inlet ends. It is, therefore, an object of the present invention to provide a coin block with exit openings that are laterally spaced from the inlet openings of the coin carriers and to provide that coin block with curved portions that give all coins passing through that coin block a limited horizontal component of force in the direction of those exit openings so that coins which should enter the inlet ends of those coin carriers will do so while excess inserted coins will bound through the exit openings.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

Figure 2:
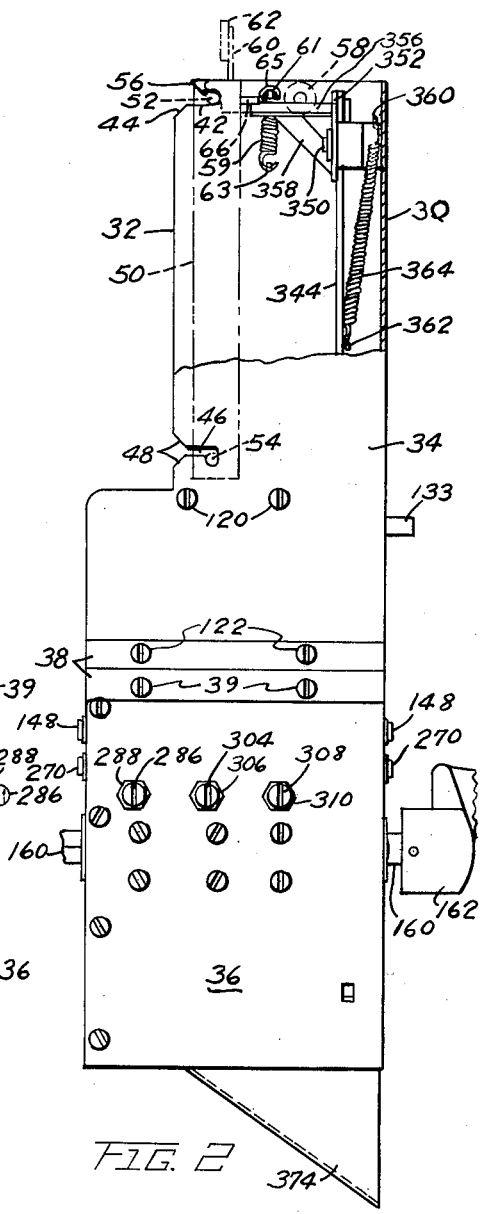
Figure 3:
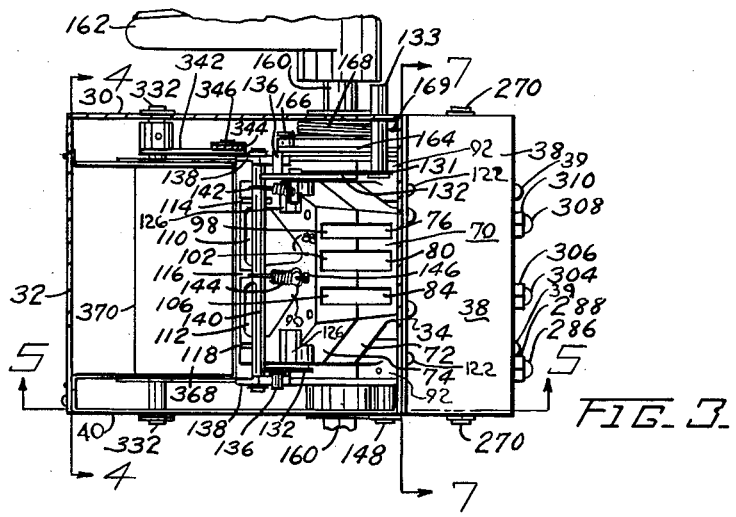
Figure 4:
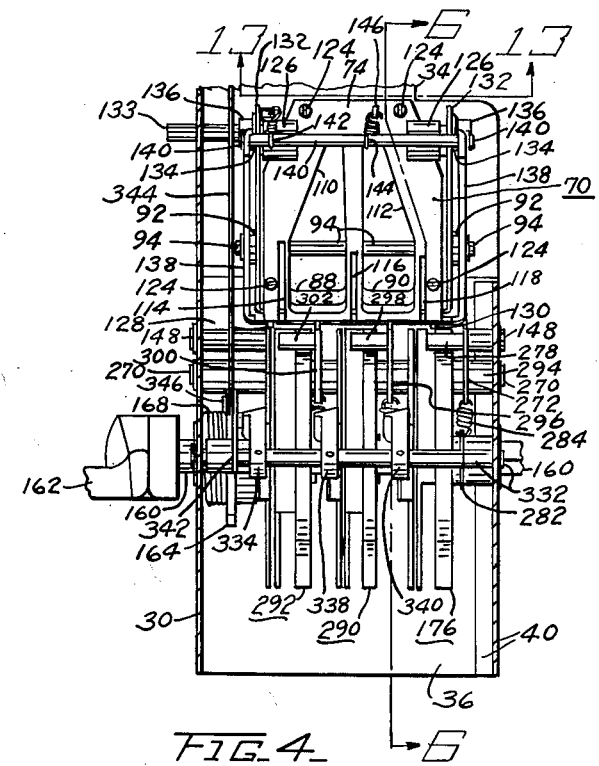
Figure 5:
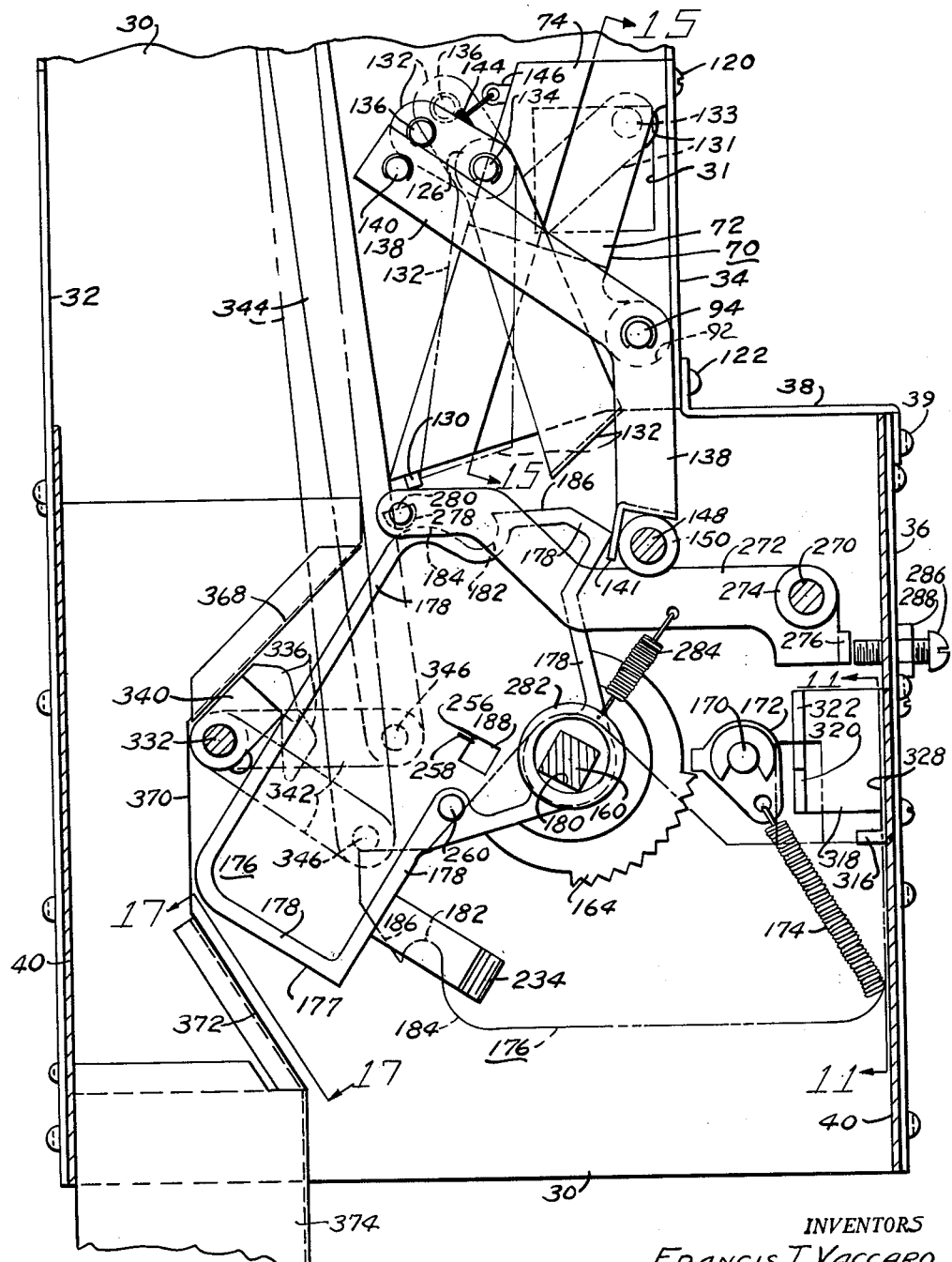
Figure 6:
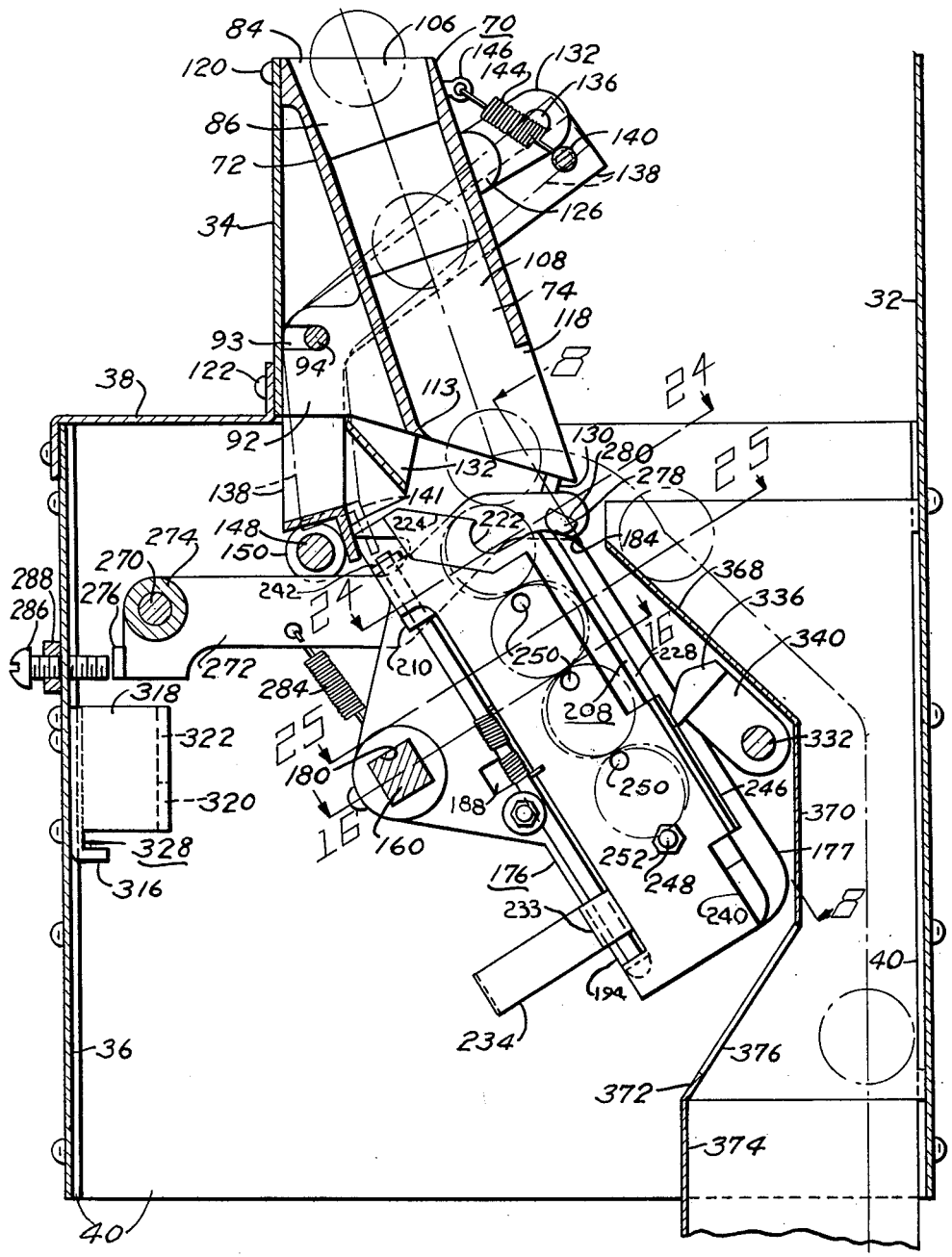
Figure 15:
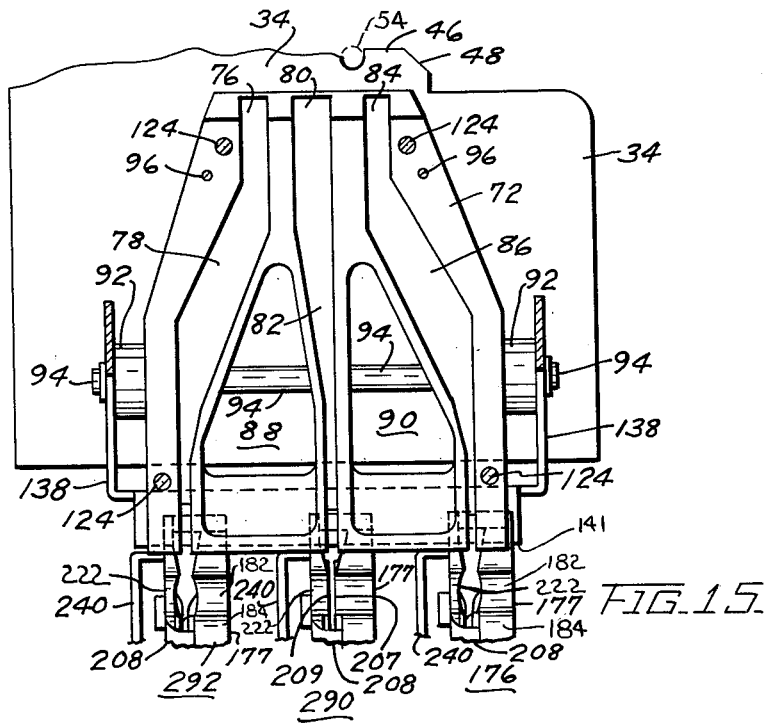
Figure 16:
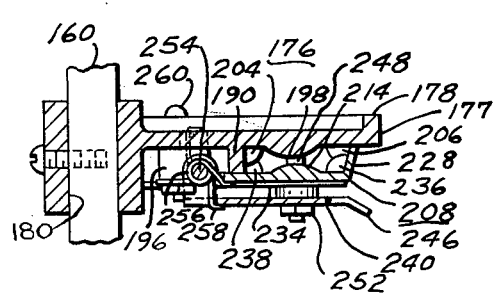
Figures 24, 25:
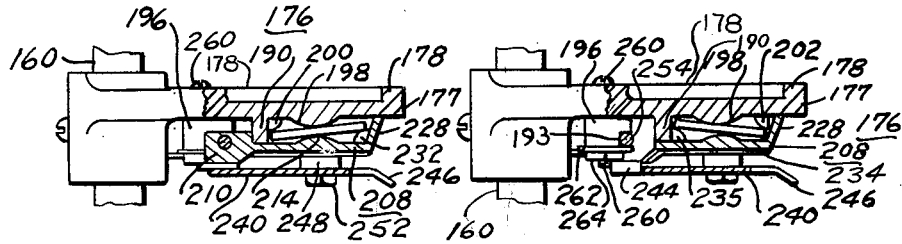
Figures 26, 27:
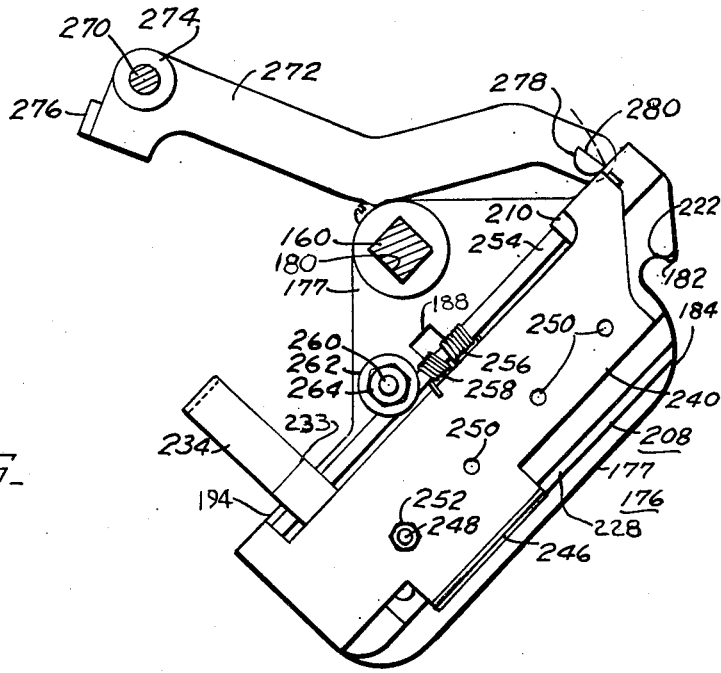

In the drawing, FIG. 1 is a front elevational view of one form of actuating device that is made in accordance with the principles and teachings of the present invention, and it shows a slug rejector by dashed lines, FIG. 2 is a partially broken, partially sectioned, side elevational view of the actuating device of FIG. 1, and it shows the said slug rejector by dashed lines, FIG. 3 is a partially broken, sectional view through the actuating device of FIG. 1, and it is taken along the plane indicated by the lines 3—3 in FIG. 1, FIG. 4 is a partially broken, sectional view through the actuating device of FIG. 1 when the returned coin chute of that device is removed, and it is taken along the plane indicated by the line 4—4 in FIG. 3, FIG. 5 is a broken, sectional view, on a larger scale, through the actuating device of FIG. 1, and it is taken along the plane indicated by the line 5—5 in FIG. 3, FIG. 6 is a broken, sectional view, on the scale of FIG. 5, through the actuating device of FIG. 1, and it is taken along the broken plane indicated by the line 6—6 in FIG. 4, FIG. 7 is a broken, sectional view, on the scale of FIG. 5, through the actuating device of FIG. 1, and it is taken along the plane indicated by the line 7—7 in FIG. 3, FIG. 8 is a broken, elevational view, on the scale of FIG. 5, of one of the coin carriers of the actuating device of FIG. 1, and it is taken along the plane indicated by the line 8—8 in FIG. 6, FIG. 9 is a broken, sectional view through the coin carrier shown in FIG. 8, and it is taken along the plane indicated by the line 9—9 in FIG. 8, FIG. 10 is another broken, sectional view through the coin carrier shown in FIG. 8, and it is taken along the plane indicated by the line 10—10 in FIG. 8, FIG. 11 is a broken, sectional view through the actuating device of FIG. 1, it is taken along the plane indicated by the line 11—11 in FIG. 5, and it shows the coin carrier of FIG. 5 in the position indicated by dotted lines in FIG. 5, FIG. 12 is a broken, elevational view of the coin carrier of FIG. 8, but it shows the coin-supporting member of that coin carrier as it appears when moved out of coin-supporting position, FIG. 13 is a broken, sectional view, on the scale of FIG. 5, through the actuating device of FIG. 1, and it is taken along the plane indicated by the line 13—13 in FIG. 4, FIG. 14 is a broken, bottom view of the coin carrier shown in FIG. 12, FIG. 15 is a broken, elevational view, on the scale of FIG. 5, of one section of the two-section coin block of FIG. 1, and it is taken along the plane indicated by the line 15—15 in FIG. 5, FIG. 16 is a sectional view through the coin carrier shown in FIG. 8, and it is taken along the plane indicated by the line 16—16 in FIG. 6, FIG. 17 is a sectional view, on the scale of FIG. 5, and it is taken along the plane indicated by the line 17—17 in FIG. 5, FIG. 18 is an elevational view of the coin carrier and locking lever of FIG. 6, and it shows that lever in locking position, FIG. 19 is an elevational view of the coin carrier and locking lever of FIG. 6; it shows by a dotted line the path which the stop of that locking lever follows as it moves to locking position, and it shows by a second dotted line the dimensional relationship between the center of rotation of that coin carrier and the top surface of the uppermost coin held by that coin carrier and the point on the upper edge of that coin carrier where the stop of that locking lever normally rests, FIG. 20 is an elevational view of the coin carrier and locking lever of FIG. 6, and it shows that lever in unlocking position, FIG. 21 is an elevational view of an alternate form of coin carrier that can be used with the actuating device of FIG. 1, FIG. 22 is a bottom view of the coin carrier of FIG. 21, FIG. 23 is a bottom view of the coin carrier of FIG. 21, but it shows the gate and the plate which supports the coin-supporting member in coin-releasing position, FIG. 24 is a broken, sectional view through the coin carrier of FIG. 6, and it is taken along the plane indicated by the line 24—24 in FIG. 6, FIG. 25 is a broken, sectional view through the coin carrier of FIG. 6, and it is taken along the plane indicated by the line 25—25 in FIG. 6, FIG. 26 is a perspective of four coins in the stacked array they assume when they are held by the coin carrier of FIG. 6, and FIG. 27 is an elevational view of the coin carrier and locking lever of FIG. 6, and it shows that lever as it rests upon the hub of that coin carrier.

Referring to the drawing in detail, the numeral 30 denotes the rear wall of the frame of one form of actuating device that is made in accordance with the principles and teachings of the present invention. That wall has a rectangular opening 31 therein; and that opening is located approximately half way between the top and bottom of that wall, as shown particularly by FIG. 1. A wall 32 extends forwardly from the left-hand edge of the rear wall 30, and a wall 34 extends forwardly from the right-hand edge of the upper portion of the wall 30. A wall 36 extends forwardly from the right-hand edge of the lower portion of the wall 30; as indicated particularly by FIG. 1. The wall 36 is offset to the right of the wall 34 a distance somewhat less than two inches. A closure 38 closes the gap between the bottom edge of the wall 34 and the top edge of the wall 36. That closure has an upwardly extending flange at the left-hand edge thereof and has a downwardly extending flange at the right-hand edge thereof. That closure is suitably secured to the wall 36 by fasteners 39, such as screws. A front plate 40, which has rearwardly-directed flanges at the side edges thereof, spans the space between the wall 36 and the corresponding portion of the wall 32. The flanges at the side edges of the plate 40 abut the confronting faces of the walls 32 and 36.

Horizontally-directed slots 42 are formed in the walls 32 and 34 adjacent the upper ends of those walls; and inclined faces 44 are provided on the front edges of the walls 32 and 34 below and immediately adjacent the slots 42. Slots 46 are provided in the walls 32 and 34 below the level of, and in register with, the slots 42; and the inner ends of the slots 46 have downwardly-directed notches contiguous therewith. Inclined faces 48 are formed on the front edges of the walls 32 and 34 adjacent the slots 46, and those faces coact to define generally V-shaped entrances for the slots 46. The numeral 50 generally denotes a multi-coin, slug rejector of standard and usual construction. That slug rejector is equipped with horizontally-directed pins 52 adjacent the top thereof and is equipped with horizontally-directed pins 54 adjacent the bottom thereof. The pins 52 telescope into the slots 42, and the pins 54 telescope into the slots 46 and rest within the vertically-directed notches that are contiguous with the inner ends of those slots. That slug rejector has one entrance for all inserted coins; and it will test and sort all inserted coins. The slug rejector used with the actuating device of FIG. 1 will accept authentic pennies, nickels, and quarters and will reject slugs and all coins of other denominations.

Latches 56 are rotatably secured at the outer faces of the walls 32 and 34 by pivots 58 which have large heads. Those latches have ears 61 which extend inwardly through openings 65 in the walls 32 and 34; and those ears receive loops at the upper ends of helical extension springs 59. Loops at the lower ends of those springs are telescoped over ears 63 at the inner faces of the side walls 32 and 34. Those springs normally hold the latches 56 down in position to prevent movement of the pins 52 of the slug rejector 50 outwardly of the slots 42. However, those springs can yield to permit the latches 56 to be raised upwardly to free the pins 52 for movement outwardly of those slots. Such movement facilitates ready separation of the slug rejector 50 from the frame of the actuating device provided by the present invention.

The slug rejector 50 has a rotatable scavenger lever 60; and that lever carries a pivot 64 which rotatably supports a roller 62. A pin 66 is carried by the lever 60, and that pin extends rearwardly from the lever 60, as indicated particularly by FIG. 2. When the actuating device of the present invention is mounted in a vending machine, and when the slug rejector 50 is secured to that actuating device, the roller 62 will be adjacent a portion of the scavenging system of that vending machine. As a result, when a patron presses the scavenging button at the exterior of the vending machine, the roller 62, the lever 60, and the pin 66 will be forced to move downwardly.

Referring particularly to FIGS. 5, 6, 13 and 15, the numeral 70 denotes a two-section block which is disposed immediately adjacent the outlet openings of the slug rejector 50. The block 70 has an outer section 72 which is secured to the wall 34 by fasteners 120 and 122, such as screws. The fasteners 122 extend through the upwardly extending flange on the closure 33 and through the wall 34 and seat in threaded sockets in the outer section 72. The fasteners 120 extend through openings in the wall 34 and seat in threaded sockets in the outer section 72. The inner section 74 abuts the outer section 72, as shown by FIGS. 5, 6 and 13.

The outer section 72 is shown particularly by FIG. 15, and it has a slot 76 in the upper face thereof. That slot communicates with a passageway 78 which extends vertically downwardly, then extends downwardly and to the left, and finally extends vertically downwardly. A slot 80 is disposed to the right of the slot 76, as those slots are viewed in FIG. 15; and that slot communicates with a passageway 82 which extends vertically downwardly from that slot but which becomes narrower adjacent the lower end thereof. A slot 84 is disposed to the right of the slot 80, as those slots are viewed in FIG. 15, and a passageway 86 extends downwardly from that slot. That passageway 86 initially extends vertically downwardly, then extends downwardly and to the right and finally extends vertically downwardly.

The outer section 72 is preferably formed as a die casting; and it is formed with an opening 88 of generally triangular configuration intermediate the passages 78 and 82. An opening 90 of generally triangular configuration is formed intermediate the passages 82 and 86. Those openings are provided to reduce the overall weight and the amount of metal used in forming the outer section 72. Generally cylindrical bosses 92 extend outwardly from the sides of the outer section 72, as shown particularly by FIG. 15; and those bosses have slots 93 therein which accommodate a pivot 94.

Alining pins 96 are seated in sockets in the outer section 72, and those pins precisely align the inner section 74 with the outer section 72. When those two sections are precisely aligned, a slot 98 in the inner section 74 is in register with, and serves as a continuation of, the slot 76. A passageway 100 extends downwardly from the slot 98, and that passageway is similar to the passageway 78 in the outer section 72. Also when the two sections 74 and 72 are precisely alined, a slot 102 in the inner section 74 is in register with, and serves as a continuation of, the slot 80. A passageway 104 extends downwardly from the slot 102, and that passageway is similar to the passageway 82. Further, when the two sections 72 and 74 are precisely alined, a slot 106 in the inner section 74 is in register with, and serves as a continuation of, the slot 84 in the outer section 72. A passageway 108 extends downwardly from the slot 106, and that passageway is similar to the passageway 86.

The inner section 74 is preferably formed as a die casting; and it is formed with an opening 110 of generally triangular configuration intermediate the passageways 100 and 104. An opening 112 of generally triangular configuration is formed intermediate the passageways 104 and 108. The openings 110 and 112 are in register with the openings 88 and 90, as shown particularly by FIG. 4; and the openings 110 and 112 reduce the weight and the amount of metal used in the inner section 74.

In one preferred embodiment of the present invention, the slots 76 and 98 and the passageways 78 and 100 accommodate quarters, and the slots 80 and 102 and the passageways 82 and 104 accommodate nickels, and the slots 84 and 106 and the passageways 86 and 108 accommodate pennies. One of the functions of the two-section block 70 is to accept quarters, nickels and pennies from the closely spaced exit openings of the slug rejector 50 and cause those coins to move along diverging passageways to openings which are spaced apart appreciable distances.

As indicated by FIGS. 3, 4, 6 and 13, vertically-directed exit openings 114, 116 and 118 are formed in the exposed face of the inner section 74. As indicated particularly by FIG. 4, the opening 114 is the tallest of the three and the opening 118 is the smallest of the three; the opening 114 having a height greater than the diameter of a quarter, the opening 116 having a height greater than the diameter of a nickel, and the opening 118 having a height greater than the diameter of a penny. These exit openings are adjacent, and contiguous with, the lower ends of the passageways 78–100, 82–104 and 86–108.

Fasteners 124 extend through openings in the inner section 74 and seat in threaded sockets in the outer section 72. Those fasteners normally enable the two sections to serve as one, overall unitary block.

The numeral 126 denotes generally cylindrical bosses which are formed on the inner section 74 and which project outwardly from the sides of that section, as indicated particularly by FIG. 4. Those bosses carry short outwardly-extending pivots 134; and those bosses and those pivots are in alignment with each other. A small cylindrical boss 128 and a small cylindrical boss 130 extend downwardly from the bottom face of the inner section 74. The boss 128 is disposed outwardly of the slot 114 and the boss 130 is disposed outwardly of the slot 118, as shown particularly by FIG. 4.

The numeral 132 denotes a generally U-shaped coin-intercepting and coin-deflecting member. Openings are provided adjacent the upper ends of the arms of that member; and those openings telescope over, and enable those arms to rotate relative to, the short pivots 134 carried by the bosses 126. Each of the arms of the U-shaped member 132 is bent forwardly at an angle adjacent the upper end thereof, as shown by FIGS. 1 and 4. The closed end of that U-shaped member is set at an angle to the axes of the arms of that member, as shown particularly by FIG. 5; and the angle selected for that closed end is such that the said closed end will be parallel to the bottom face of the inner section 74 when that U-shaped member is rotated to its clockwise position in FIG. 5. The bosses 128 and 130 will intercept the front edge of the closed end of the U-shaped member 132 and will thus limit clockwise rotation of that member in FIG. 5.

Pins 136 are carried by the upper ends of the arms of the U-shaped member 132, and those pins extend outwardly from the outer faces of those arms. An arm 131 projects upwardly and rearwardly from one of the arms of the U-shaped coin-intercepting and coin-deflecting member 132, as shown by FIG. 1. The free end of the arm 131 carries a pin 133, and that pin extends rearwardly through the opening 31 in the rear wall 30 of the frame of the actuating device. That pin will be adjacent a portion of the "empty" mechanism of the vending machine; and that portion of that mechanism will, whenever the vending machine is empty, force the pin 133 to move downwardly. At such time, the closed end of the U-shaped member 132 will be in the dotted line position shown in FIG. 5.

The numeral 138 denotes a U-shaped member which has a flange 141 extending downwardly from the closed end thereof, and which has bent arms that extend vertically upwardly and then incline upwardly and to the left, as shown by FIG. 5. Openings are provided adjacent the bends in the arms of the U-shaped member 138; and those openings telescope over, and permit rotation of those arms relative to, the opposite ends of the pivot 94. Openings also are provided adjacent the free ends of the arms of the U-shaped member 138, and those openings accommodate the ends of an elongated rod 140.

Annular grooves are formed adjacent the outer ends of the short pivots 134, adjacent the outer ends of the elongated pivot 94, and adjacent the outer ends of the elongated rod 140. C-washers will be set in those grooves to hold the U-shaped coin deflector 132 in assembled relation with the short pivots 134, to hold the U-shaped member 138 in assembled relation with the elongated pivot 94, and to hold the elongated rod 140 in assembled relation with the U-shaped member 138. Two annular grooves are formed in the elongated rod 140 intermediate the ends of that rod; and the loop at one end of a helical extension spring 142 is disposed within one of those grooves. The loop at the other end of that spring is hooked through an opening in an ear on one of the arms of the U-shaped coin deflector 132. The loop at one end of a helical extension spring 144 is disposed within the other of the annular grooves intermediate the ends of the elongated rod 140, and the loop at the other end of that spring is hooked through an opening in a pin 146 which is suitably secured to the inner section 74 of the block 70. The spring 144 biases the U-shaped member 138 for rotation in the clockwise direction in FIG. 5 but can yield to permit rotation of that U-shaped member to the counter clockwise position shown in FIG. 5. The spring 142 biases the upper ends of the arms of the U-shaped coin deflector 132 toward the upper ends of the arms of the U-shaped member 138; and normally the pins 136 carried by the upper ends of the arms of the U-shaped coin deflector 132 will abut the upper edges of the arms of the U-shaped member 138. The upper edges of the arms of the U-shaped member 138 are bent inwardly to form a smooth surface against which the pins 136 carried by the arms of the U-shaped coin deflector 132 can readily slide.

The numeral 148 denotes an elongated rod which has one end thereof supported by the rear wall 30 and has the other end thereof supported by the front plate 40. Three resilient sleeves 150 are telescoped over the rod 148, and those sleeves are spaced along the length of that rod. Those sleeves are in register with the downwardly-depending flange 141 on the closed end of the U-shaped member 138, and those sleeves can cushion the stopping of the U-shaped member 138 as that member reaches the end of its counter clockwise rotation in FIG. 5.

The numeral 160 denotes a shaft which has one end thereof journaled in a bushing held by the rear wall 30 and has the other end thereof journaled in a bushing held by the front plate 40. The major portion of the shaft 160 is square in cross section, as indicated by FIG. 5. A handle 162 is suitably secured to the rear end of the shaft 160, and that handle is disposed rearwardly of the rear wall 30. The handle 162 will be exposed at the exterior of the vending machine and will be actuated by the patron to effect the actuation of the vending machine.

A ratchet 164 is fixedly secured to the shaft 160 at a point adjacent the rear wall 30; and a pin 166 extends from the rear face of that ratchet toward the rear wall 30, as indicated by FIG. 3. The pin 166 has a groove therein which accommodates a loop in one end of a torsion spring 168. That spring surrounds the rear end of the shaft 160; and the other end of that spring is held by a pin 169 which is secured to the rear wall 30 of the frame of the actuating device, as shown by FIG. 3. That spring biases the shaft 160 for rotation in the clockwise direction in FIG. 5, but that spring can yield to permit that shaft to be rotated in the counter clockwise direction.

A short pivot 170 is secured to, and extends forwardly from, the rear wall 30; and that pivot is disposed to the right of the shaft 160, as that pivot and shaft are viewed in FIG. 5. A pawl 172 is rotatably mounted on the pivot 170, and a C-washer is used to prevent accidental separation of that pawl from that pivot. The pawl 172 can engage the teeth on the ratchet 164; and that pawl will permit free rotation of that ratchet in the counter clockwise direction in FIG. 5 but will prevent only limited rotation of that ratchet in the clockwise direction until after the teeth on that ratchet have moved out of engagement with that pawl. Once the teeth on that ratchet have been moved beyond that pawl, that pawl will return to the position shown by FIG. 5; and thereafter that shaft can be rotated in the clockwise direction to its original position. A helical extension spring 174 has the upper end thereof hooked through an opening in the pawl 172 and has the lower end thereof hooked through an ear that is suitably punched out of the wall 36. That spring biases the pawl 172 to the position shown by FIG. 5.

As shown by FIG. 4, the actuating device provided by the present invention has three coin carriers; and those coin carriers are generally denoted by the numerals 176, 290 and 292. The coin carrier 176 is shown in detail in FIGS. 8–10, 12, 14, 16, 24 and 25; and it includes a generally rectangular plate 177 which has a generally triangular extension that projects to the right in FIG. 5. That extension is provided with a sleeve-like hub which has a rectangular opening 180 therein; and that opening snugly accommodates the rectangular portion of the shaft 160. A strengthening rib 178 is formed on the outer face of the plate 177, as indicated particularly by FIG. 5; and that rib extends around the periphery of that plate. A concave recess 182 is provided in the periphery of the plate 177, and a convex surface 184 is contiguous with the lower portion of that recess. A plane surface 186 inclines upwardly from the recess 182 and abuts a second plane surface at the top of the plate 177. A square opening 188 is formed in the plate 177 to the left of the opening 180, as those openings are viewed in FIG. 5.

The inner face of the plate 177 has a longitudinally-extending wall 190 thereon, and that wall extends throughout substantially the full length of that plate. A boss 192 is contiguous with, and extends to the left from, the upper portion of the wall 190, as that boss and wall are viewed in FIG. 9; and that boss has a semi-circular groove therein. A boss 194 is contiguous with, and extends to the left from, the lower portion of the wall 190 in FIG. 9; and that boss has a semi-circular groove therein. The axes of those grooves are parallel to, but are spaced to the right of, the wall 190. A boss 196, that is roughly intermediate the bosses 192 and 194, extends forwardly from the front face of the plate 177. As indicated particularly by FIG. 25, that boss has a notch 193 therein.

The numeral 198 denotes a cylindrical-faced rib which is formed on the inner face of the plate 177 and which extends substantially the full length of that plate. As indicated particularly by FIG. 9, the recess 182 extends into the rib 198; and that rib has a taper 195 immediately adjacent the upper edge of that recess and has a further taper 197 adjacent the lower edge of that recess. A number of sockets 199 are formed in the rib 198, as shown particularly by FIG. 9; and the center-to-center spacings of those sockets are equal to the diameter of a penny.

The numeral 200 denotes a small boss which is formed on the inner face of the plate 177, and that boss abuts the wall 190. A boss 202 is disposed below the level of, and to the right of, the boss 200, a boss 204 is disposed directly below the boss 200, and a boss 206 is disposed directly below the boss 202. Each of those bosses has an abruptly squared-off bottom face and a smoothly-rounded upper face. The bosses 202 and 206 are spaced from the wall 190 distances which are less than the diameter of a penny. As indicated by FIGS. 24 and 25, the bosses 200, 202, 204 and 206 have arcuate faces in plan; and, as indicated by FIG. 9, the upper faces of those bosses are arcuate in elevation.

The numeral 208 denotes a gate for the coin carrier 176, and that gate has an ear 210 adjacent the upper end thereof and has an ear 212 adjacent the lower end thereof. The upper face of the ear 210 on the gate 208 can abut the lower face of the boss 192 on the plate 177, and the lower face of the each 212 on that gace can abut the upper face of the boss 194 on that plate. Cylindrical openings are provided in the ears 210 and 212, and the axes of those openings will be coaxial with the axes of the semi-cylindrical grooves in the bosses 192 and 194 on the plate 177. The inner face of the gate 208 has a cylindrical-faced rib 214 as shown particularly by FIG. 10. That rib extends substantially the full length of that gate, and it is disposed so it will be in register with the rib 198 on the plate 177 whenever the gate 208 is parallel with the plate 177.

The gate 208 is generally rectangular in elevation, but it has a concave recess 222 that is similar to the recess 182 in the plate 177. Further, the gate 208 has a plane surface 224 which inclines upwardly from the recess 222; and that surface is similar to the inclined surface 186 on the plate 177. The inclined surface 224 abuts a second plane surface on the gate 298 that is similar to the second plane surface at the top of the plate 177. As indicated particularly by FIG. 10, the recess 222 extends into the rib 214; and a taper 226 is provided on that rib immediately above that recess, and a taper 216 is provided on that rib immediately below that recess. The rib 214 has a flattened portion 218 adjacent the lower end thereof, as indicated particularly by FIG. 10. The rib 214 also has openings 220 therein which extend all the way through the gate 208; and those openings will be in register with the sockets 199 in the rib 198 of the plate 177 whenever that plate and that gate are parallel. The openings 220 in the rib 214 have the same size and shape as the openings 199 in the rib 198.

A rib 228 is provided at the left-hand edge of the gate 208, as that gate is viewed in FIG. 10; and that rib has a portion of the lower end thereof cut-away, as at 230. When the gate 208 is parallel to the plate 177, the free edge of the rib 228 will abut the inner face of the plate 177. The engagement between the rib 228 and the inner face of the plate 177 will fix the spacing between the free edges of the plate 177 and of the gate 208.

The numeral 232 denotes a boss which is formed on the inner face of the gate 208 adjacent the free edge of that gate. A boss 235 is disposed below the level of, and to the right of, the boss 232, and the boss 235 will be immediately adjacent the wall 190 on the plate 177 whenever the gate 208 and the plate 177 are parallel. A boss 236 is disposed directly below the boss 232, and a boss 238 is disposed directly below the boss 235. Each of the bosses 232, 235, 236 and 238 has an abruptly squared-off bottom face and a smoothly-rounded upper face. As indicated by FIGS. 24 and 25, the bosses 232, 235, 236 and 238 are arcuate in plan. Also, as indicated by FIG. 10, the upper portions of those bosses are arcuate in elevation.

The boss 200 is adjacent the wall 190 on plate 177 while the boss 232 is adjacent the rib 228 on the gate 208; and hence those bosses will engage oppositely-disposed portions of the periphery of a penny held by the coin carrier 176. Similarly, the boss 204 is adjacent the wall 190 on plate 177 while the boss 236 is adjacent the rib 228 on the gate 208; and hence those bosses will engage oppositely-disposed portions of the periphery of a penny held by the coin carrier 176. The boss 202 is adjacent the rib 228 on the gate 208 while the boss 235 is adjacent the wall 190 on the plate 177; and hence those bosses will engage oppositely-disposed portions of the periphery of a penny held by the coin carrier 176. Similarly, the boss 206 is adjacent the rib 228 on the gate 208 while the boss 238 is adjacent the wall 190 on the plate 177; and hence those bosses will engage oppositely-disposed portions of the periphery of a penny held by the coin carrier 176. The ribs 198 and 214 will engage the central portions of all of the pennies held by the coin carrier 176, and they will hold the confronting portions of adjacent pennies in register with each other.

The numeral 234 denotes a leaf spring which is secured to the outer face of the gate 208. That leaf spring has an offset 233 therein; and that offset is set in register with, and accommodates, one face of the ear 212 of the gate 208, as shown by FIG. 14. The free end of the leaf spring 234 is rounded, as shown by FIGS. 11 and 14.

The numeral 240 denotes a plate which is generally rectangular in elevation and which has an ear 242 adjacent the top thereof and which has an ear 244 adjacent the bottom thereof. The bottom face of the ear 242 can abut the upper face of the boss 192 on the plate 177, and the upper face of the ear 244 can abut the bottom face of the boss 194 on that plate. Openings are provided in the ears 242 and 244, and those openings are coaxial with the openings in the ears 210 and 212 on the gate 208. A lip 246 is provided at the free edge of the plate 240, and the free end of that lip inclines outwardly and away from the gate 208. A shouldered pin 248 can be set in any one of four alined openings 250 in the plate 240; and that pin can be held in the desired opening 250 by a nut 252. The openings 250 are smaller than, but will be in register with, the openings 220 in the rib 214 of gate 208 and the sockets 199 in the rib 198 of plate 177 whenever the plate 240, the gate 208 and the plate 177 are parallel. The shoulder of the pin 248 has a larger diameter than does any of the openings 220 in the rib 214 on the gate 208, and hence that shoulder will serve to space the plate 240 from the outer face of the gate 208. The pin 248 will be long enough to extend through the openings 220 in the rib 214 of gate 208 and into the sockets 199 in the rib 198 of the plate 177 whenever the plate 240, the gate 208 and the plate 177 are parallel.

An elongated pivot 254 is telescoped through the opening in the ear 244, through the semi-cylindrical groove in the boss 194, through the opening in the ear 212, through the notch 193 in the boss 196, through an opening in the ear 210, through the semi-cylindrical groove in the boss 192, and then through an opening in the ear 242. Prior to the time the upper end of the pivot 254 is telescoped through the opening in the ear 210, two torsion springs 258 and 256 will be telescoped over that upper end of that pivot. After the upper end of the pivot 254 has been telescoped through the opening in the ear 210, through the semi-cylindrical groove in the boss 192, and through the opening in the ear 242, a washer 262 will be forced into holding engagement with that pivot by a bolt 260 and a nut 264. That bolt extends through an opening in the boss 196; and the nut 260 can be tightened relative to that bolt, to force the washer 262 tightly against the pivot 254 and thereby tightly force that pivot against the notch 193. The overall result is that tightening of the bolt 260 or of the nut 264 will fixedly prevent any shifting of that pivot relative to the plate 177, the gate 208 or the plate 240.

One end of the torsion spring 256 will be lodged in the opening 188 in the plate 177, and the other end of that spring will bear against the outer face of the gate 208. As a result, that spring will bias that gate for rotation into parallel relation with the plate 177. However, that spring will be able to yield to permit that gate to be rotated away from the plate 177. FIGS. 14, 16, 24 and 25 show the gate 208 parallel to the plate 177, and FIG. 11 shows that gate as it appears when it has been rotated away from that plate.

One end of the spring 258 is lodged in the opening 188, and the other end of that spring bears against the outer face of the plate 240. As a result, that spring will bias that plate for rotation into parallel relation with the gate 208 and with the plate 177. However, that spring can yield to permit the plate 240 to be rotated away from the gate 208 and from the plate 177. The normal position of the plate 240 is indicated by FIGS. 16, 24 and 25, the position of that plate when the gate 208 has rotated it away from the plate 177 is indicated by FIG. 11, and the position of the plate 240 when it has been rotated away from the gate 208 is indicated by FIGS. 12 and 14.

Whenever the plate 240 is parallel to the plate 177, the shank of the shouldered pin 248 will extend through one of the openings 220 in the rib 214 of the gate 208 and extend into one of the sockets 199 in the rib 198 of the plate 177. In doing so, that pin will serve as a coin-supporting element; and that pin will, depending upon the particular opening 250 in which it is mounted, support one, two, three or four pennies. When the plate 240 is rotated away from the plate 177, as shown by FIGS. 11, 12 and 14, the shouldered pin 248 will be unable to hold the pennies in the coin-receiving recess defined by the wall 190 and the ribs 198, 214 and 228; and thereupon those pennies will fall from the coin carrier 176.

It will be noted that the diameter of the shank of the shouldered pin 248 is much smaller than the space between the rib 228 and the wall 190. This means that dirt and other foreign matter that might tend to accumulate within the coin-receiving recess in the coin carrier 176 will be able to fall downwardly past the pin 248. As a result, that coin-receiving recess will remain free of dirt and other foreign matter that could tend to prevent prompt and effective falling of the pennies from that coin-receiving recess.

The coin carriers 290 and 292 are very similar to the coin carrier 176—each of those coin carriers having a plate 177, a gate 208, a plate 240, and a shouldered pin 248. However, the center-to-center spacings between the openings 199 and 220 in the coin carrier 290 will be equal to the diameter of a nickel, and the center-to-center spacings between the openings 199 and 220 in the coin carrier 292 will be equal to the diameter of a quarter. Further, the cut-away portions 230 of the ribs 228 on the gates 208 of the coin carriers 290 and 292 will be longer than the cut-away portion of the rib 228 on the gate 208 of the coin carrier 176. The cut-away portion 230 of the rib 228 of each coin carrier should, ideally, extend upwardly from the bottom of the gate 208 of that coin carrier to a point which is spaced above the level of the center line of the lowermost opening 220 a distance less than one half of the diameter of the coin to be held within the coin-receiving recess of that coin carrier. Those cut-away portions are intended to facilitate prompt and effective movement of the coins out of the coin-receiving recesses of the coin carriers when those coin carriers reach their fully rotated positions, but they must not be so long that they permit movement of the coins out of those coin-receiving recesses prior to the time those coin carriers are immediately adjacent those fully rotated positions.

The vertical and horizontal spacings between the bosses 200, 202, 204, 206, 232, 235, 236 and 238 will be greater, in the case of the coin carrier 292, than they are in the case of the coin carrier 176, because of the differences between the diameters of quarters and pennies. Similarly, the horizontal spacing between the wall 190 and the rib 228 of the coin carrier 292 will be greater than the horizontal spacing bebtween the wall 190 and the rib 228 of the coin carrier 176 because of the differences between the diameters of quarters and pennies. The horizontal spacing between the wall 190 and the rib 228 of the coin carrier 290 will be larger than the horizontal spacing between the wall 190 and the rib 228 of the coin carrier 176 but will be smaller than the horizontal spacing between the wall 190 and the rib 228 of the coin carrier 292 because of the differences between the diameters of nickels and pennies and quarters.

The inner face of the plate 177 and the inner face of the gate 208 of the coin carrier 290 could, if desired, be equipped with cylindrical-faced ribs 198 and 214 and could be equipped with small bosses 200, 202, 204, 206, 232, 235, 236 and 238. If that plate and gate were so equipped, each nickel would be inclined oppositely of each other nickel and which it touched; just as each penny is inclined oppositely of each other penny which it touches and just as each quarter is inclined oppositely of each other quarter which it touches. However, because the rims of nickels are so wide, the opposite inclination of contiguous nickels is not significant; and hence the coin carrier 290 can be made with flat-faced ribs rather than cylindrical-faced ribs at the inner faces of plate 177 and gate 208; and that coin carrier can be made without the bosses 200, 202, 204, 206, 232, 235, 236 and 238. The flat-faced ribs of the coin carrier 290 are denoted by the numerals 207 and 209.

The inlet end of the coin carrier 292 underlies the bottom of the passageway 78–100, the inlet end of the coin carrier 290 underlies the bottom of the passageway 82–104, and the inlet end of the coin carrier 176 underlies the bottom of the passageway 86–108. The outlet end of the coin carrier 292 will be in register with the slot 380, the outlet end of the coin carrier 290 will be in register with the slot 378, and the outlet end of the coin carrier 176 will be in register with the slot 376 in the upper inclined portion 372 of the returned coin chute.

The sleeve-like hub portions of the coin carriers 176, 290 and 292 fit snugly over the square portion of the shaft 160. Suitable set screws are carried by those sleeve-like hub portions to maintain predetermined spacings of those coin carriers along the length of the shaft 160.

The numeral 270 denotes an elongated pivot that has the rear end thereof supported by the rear wall 30 and has the front end thereof supported by the front plate 40. Three identical levers are rotatably supported by the pivot 270; and those levers are denoted by the numerals 272, 296 and 300. Each of those levers has a sleeve-like hub 274 that telescopes over, and rotates relative to, the pivot 270. Each of the levers 272, 296 and 300 has an ear 276 that is adjacent, but is disposed below the level of, the sleeve-like hub 274. Each of the levers 272, 296 and 300 has a horizontally-extending portion, has a portion that inclines upwardly from the free end of that horizontally-extending portion, and has a second horizontally-extending portion.

The angles defined by the first horizontally-extending portions and the upwardly-inclined portions of those levers are obtuse angles. A pin-like stop 278 is secured to the second horizontally-extending portion of the lever 272 adjacent the free end of that portion; and that stop is perpendicular to the plane defined by that lever. The stop 278 and the hub 274 extend outwardly from the same face of the lever 272; and, in FIG. 4, that stop and that hub extend to the left from that lever. A pin-like stop 298 is secured to the second horizontally-extending portion of the lever 296 adjacent the free end of that portion; and that stop is perpendicular to the plane defined by that lever. The stop 298 and the hub 274 extend outwardly from the same face of the lever 296; and in FIG. 4, that stop and that hub extend to the left from that lever. A pin-like stop 302 is secured to the second horizontally-extending portion of the lever 300 adjacent the free end of that portion; and that stop is perpendicular to the plane defined by that lever. The stop 302 and the hub 274 extend outwardly from the same face of the lever 300; and, in FIG. 4, that stop and that hub extend to the left from that lever. Each of the pin-like stops 278, 298 and 302 has an inclined flat surface on the upper portion thereof. The hubs 274 of the levers 272, 296 and 300 are suitably dimensioned to cause the lever 272 to dispose its stop 278 in register with the recesses 182 and 222 of the coin carrier 176, to cause the lever 296 to dispose its stop 298 in register with the recesses 182 and 222 of the coin carrier 290, and to cause the lever 300 to dispose its stop 302 in register with the recesses 182 and 222 of the coin carrier 292.

A ring 282 encircles the shaft 160 at a point intermediate the sleeve-like hub portions of the coin carriers 292 and 290, a second ring 282 encircles the shaft 106 at a point intermediate the sleeve-like hub portions of the coin carriers 290 and 176, and a third ring 282 encircles the shaft 160 at a point intermediate the front plate 40 and the sleeve-like hub portion of the coin carrier 176. Helical extension springs 284 have their lower ends hooked through openings in those rings and have their upper ends hooked through openings in the levers 272, 296 and 300. Those springs bias the stops 278, 298 and 302 on the free ends of the second horizontally-extending portions of those levers for downward movement, but those springs can yield to permit upward movement of those stops.

A set screw 286 is mounted in a threaded opening in the wall 36; and a nut 288 is threaded onto the shank of that set screw to selectively lock that set screw against rotation relative to that wall. The inner end of the shank of that set screw is in register with, and can be moved toward and away from, the ear 276 on the lever 272. Where desired, the set screw 286 can be rotated to engage the ear 276 and thereby rotate the lever 272 far enough in the counter clockwise direction, in FIG. 6, to raise the stop 278 up out of the path of movement of the recesses 182 and 222 of the coin carrier 176. This rotation of the set screw 286 will be effected whenever the sales price of the product to be vended does not require the insertion of pennies. However, if the sales price of the product to be vended does require the insertion of pennies, the shank of the screw 286 will be spaced from the ear 276; and the spring 284 will normally hold the stop 278 in engagement with the convex surface 184 that is contiguous with the recess 182 in the plate 177 of the coin carrier 176.

Set screws 304 and 308, which are similar to the set screw 286, are mounted in threaded openings in the wall 36; and the shanks of those set screws are, respectively, in register with the ear 276 on the lever 296 and the ear 276 on the lever 300. Nuts 306 and 310 are, respectively, threaded onto the shanks of the set screws 304 and 308; and those nuts can be used to lock those screws against rotation relative to the wall 36. Where desired, the screw 304 can be rotated far enough to cause the stop 298 on the lever 296 to be held above and out of register with the recesses 182 and 222 of the coin carrier 290; and, where desired, the screw 308 can be rotated far enough to cause the stop 302 on the lever 300 to be held above and out of register with the recesses 182 and 222 of the coin carrier 292. However, where the sales price of the product to be vended requires the insertion of nickels and quarters, the set screws will be set so they are wholly out of the paths of movement of the ears 276 on the levers 296 and 300. Where the sales price of the product to be vended requires the insertion of nickels and quarters, one of the springs 284 will hold the stop 298 against the convex surface 184 that is contiguous with the recess 182 of the plate 177 of the coin carrier 290, and the last of the springs 284 will hold the stop 302 against the convex surface 184 that is contiguous with the recess 182 of the plate 177 of the coin carrier 292.

A spacer 295 is telescoped over the elongated pivot 270, and that spacer is intermediate the rear wall 30 and the hub 274 of the lever 300. Another spacer 294 is telescoped over the pivot 270; and that spacer is intermediate the front plate 40 and the hub 274 of the lever 272. The spacers 294 and 295 coact with the hubs 274 to hold the stops 278, 298 and 302, respectively, of the levers 272, 296 and 300 in register with the recesses 182 and 222 of the coin carriers 176, 290 and 292.

The normal position of the stops of the various levers 272, 296 and 300 is indicated by FIG. 6. Those stops rest upon the convex surfaces 184 which are contiguous with the concave recesses 182 in the plates 177 of the coin carriers; and the flat surfaces 280 of those stops incline downwardly and away from the lower end of the coin block 70.

The numeral 314 generally denotes a cam that is fixedly secured to the inner face of the wall 36. That cam has a flat securing portion which is secured to and which abuts that inner face, has a flange 316 at the lower edge of that securing portion, has a vertical flange 318 at one side of that securing portion, and has a gently-inclined camming edge 320 and a sharply-inclined camming edge 322. The camming edges 320 and 322 are spaced from the securing portion of the cam by the flange 318; and the camming edge 322 is contiguous with, and extends upwardly from, the camming edge 320.

A cam 326 that is identical to the cam 314 is disposed to the right of the cam 314 as those cams are viewed in FIG. 7. A third cam 328 which is identical to the cams 314 and 326 is disposed to the right of the cam 326. The camming edges 320 and 322 of the various cams 314, 326 and 328 are, respectively, in register with the rounded free ends of the leaf springs 234 which are secured to the gates 208 of the coin carriers 292, 290 and 176.

The numeral 332 denotes a shaft which has the front end thereof rotatably supported by the front plate 40 and has the rear end thereof rotatably supported by the rear wall 30. That shaft is disposed to the left of the shaft 160 in FIG. 1. A cam 334 is fixedly secured to the shaft 332, and that cam has a camming face 336. That face is generally conical in configuration, but it terminates abruptly at the right-hand face of that cam, as that cam is viewed in FIG. 4. Cams 338 and 340, which are identical with the cam 334, also are secured to and rotatable with the shaft 332. The cams 334, 338 and 340 are spaced along the pivot 332 so the conical camming faces 336 thereof are, respectively, in register with the lips 246 on the plates 240 of the coin carriers 292, 290 and 176. The right-hand faces of the cams 334, 338 and 340 will be movable into position immediately adjacent the outer faces of the gates 208 of those coin carriers as long as those gates are parallel to the plates 177 of the coin carriers 292, 290 and 176 and those coin carriers are in their normal positions.

The numeral 342 denotes a crank arm which is fixedly secured to the shaft 332 at a point adjacent the rear wall 30. A connecting rod 344 has the lower end thereof secured to the free end of the crank arm 342 by a pin joint 346. A pivot 350 is secured to, and extends forwardly from, the rear wall 30; and a lever 352 is rotatably supported by that pivot. A C-washer is seated in an annular groove adjacent the forward end of the pivot 350 to hold the lever 352 in assembled relation with that pivot while permitting rotation of that lever relative to that pivot. A pin joint 354 connects the free end of the lever 352 with the upper end of the connecting rod 344. The lever 352 has a flange 356 at the upper edge thereof, and that flange extends forwardly from the plane of that lever. A reinforcing bracket 358 is secured to the vertical portion of the lever 352 and also to the under face of the flange 356. That bracket makes the lever 352 rigid although that lever is made out of relatively thin metal.

An ear 360 is provided at the inner face of the rear wall 30; and that ear is easily formed by punching it out of the metal of that wall. An ear 362 is formed at the rear face of the connecting rod 344, and that ear is formed by punching it out of the metal of that connecting rod. A helical extension spring 364 has the upper loop thereof hooked over the ear 360 and has the lower loop thereof hooked under the ear 362. That spring will bias the connecting rod 344 upwardly to the position shown by FIG. 1, but that spring can yield to permit that connecting rod to be moved downwardly.

The numeral 368 denotes the inclined upper portion of a return coin chute; and that upper portion overlies the shaft 332 and the cams 334, 338 and 340, as indicated by FIG. 6. The numeral 370 denotes a vertically-directed portion of the return coin chute, and that portion is contiguous with the lower edge of the upper portion 368. A lower inclined portion 372 of the return coin chute is contiguous with the lower edge of the vertical portion 370; and that portion inclines downwardly and to the left in FIG. 6. An inclined bottom portion 374 is provided for the return coin chute; and that bottom inclines downwardly and to the rear, as shown by FIG. 2.

As indicated particularly by FIG. 6, the lower inclined portion 372 of the return coin chute partially underlies the lower ends of the coin carriers 176, 290 and 292. As a result, any coins that are released from those coin carriers upon the withdrawal of the shouldered pins 248 will move toward the lower inclined portion 372. Vertically-directed slots 376, 378 and 380 are provided in the lower inclined portion 372; and those openings are in register with the outlet ends of the coin-receiving recesses defined by the plates 177 and the gates 208 of the coin carriers 176, 290 and 292.

*Normal Position of Parts*

The normal position of the parts of the actuating device provided by the present invention is shown by solid lines in FIGS. 1–6. The handle 162 inclines upwardly at a slight angle from the axes of the shaft 160, the coin carriers 176, 290 and 292 have the inlet ends of the coin-receiving recesses defined by the plates 177 and the gates 208 thereof in register with the bottoms, respectively, of the passageways 86–108, 82–104 and 78–100, the gates 208 are held parallel to the plates 177, and the plates 240 hold the shanks of the shouldered pins 248 in the coin-receiving recesses defined by the plates 177 and the gates 208. The outlet ends of the coin-receiving recesses defined by the plates 177 and the gates 208 of the coin carriers 176, 290 and 292 are alined, respectively, with the openings 376, 378 and 380 in the lower inclined portion 372 of the return coin chute. The upper ends of the back edges of the plates 177 bear against the downwardly-extending flange 141 on the closed end of the U-shaped member 138 and force that flange against the resilient sleeves 150 on the rod 148. The spring 142 which extends between the elongated rod 140 and the ear on one of the arms of the U-shaped coin-intercepting and coin-deflecting member 132 holds the closed end of that U-shaped member 132 in the solid-line position shown in FIG. 5, and holds that closed end out of register with the lower ends of the passageways 86–108, 82–104 and 78–100. The spring 144 will be extended at this time, but the spring 142 will not be extended appreciably. The stops 278, 298 and 302 of the levers 272, 296 and 300 will be resting upon the convex surfaces 184 which are contiguous with the concave recesses 182 of the coin carriers 176, 290 and 292. The springs 284 which bias the levers 272, 296 and 300 for rotation in the clockwise direction about the pivot 270 in FIG. 6 will be only partially extended. The conical camming surfaces 336 on the cams 334, 338 and 340 will respectively, be in register with, but will be spaced from, the lips 246 on the plates 240 of the coin carriers 292, 290 and 176, respectively. The leaf springs 234 which are secured to the gates 208 of the coin carriers 292, 290 and 176 will, respectively, be alined with the slightly-inclined camming edges 320 and with the sharply-inclined camming edges 322 of the cams 314, 326 and 328; but those leaf springs will be spaced considerable distances from those camming edges. The pawl 172 will have the ear thereof adjacent that portion of the periphery of the ratchet 164 which is above the teeth on the ratchet; and the spring 174 will be only partially extended.

The slug rejector 50 will have its pins 54 and 52 held within the slots 46 and 42, respectively; and the accepted coin outlets of that slug rejector will be in register with the slots of the two-section coin block 70. Specifically, the slug rejector outlet for pennies will be in register with the slot 84–106, the slug rejector outlet for nickels will be in register with the slot 80–102, and the slug rejector outlet for quarters will be in register with the slot 76–98. The pin 66 on the scavenging lever 60 of the slug rejector 50 will overlie the flange 356 on the lever 352; and the spring 364 will hold that flange up against that pin.

The number of coins of different denominations which must be inserted to permit a vending cycle of the vending machine to be initiated is controlled by the selection of the openings 250 in which the shouldered pins 248 are set. For example the selection of the particular opening 250 in the plate 240 of the coin carrier 176 in which a shouldered pin 248 will be set will determine whether one, two, three or four pennies will have to be inserted. The selection of the particular opening 250 in the plate 240 of the coin carrier 290 in which a shouldered pin 248 will be set determine whether one, two, three or four nickels will have to be inserted. The selection of the particular opening 250 in the plate 240 of the coin carrier 292 in which a shouldered pin 248 will be set will determine whether one, two, three or four quarters will have to be inserted. By appropriate selection of the openings 250 in which the shouldered pins 248 are to be set, it is possible to establish a sales price as small as one cent, to establish a sales price as high as one dollar and twenty-four cents, and to establish any desired sales price between one cent and one dollar and twenty-four cents.

Whenever the actuating device is intended to establish a one cent sales price, the shouldered pin 248 for the coin carrier 176 will be set in the uppermost opening 250 of the plate 240 of that coin carrier; and coin-rejecting pins will be used to reject nickels or quarters, all as described hereinafter. Whenever the actuating device is to establish a sales price of six cents, shouldered pins 248 will be set in the uppermost holes 250 of the plates 240 of the coin carriers 176 and 290, and a coin-rejecting pin will be used to reject quarters. Whenever a sales price of thirty-one cents is to be established, shouldered pins 248 will be set in the uppermost openings 250 of the plates 240 of the coin carriers 176, 290 and 292. Whenever a sales price of sixty-two cents is to be established, shouldered pins 248 will be set in the second uppermost openings 250 of the plates 240 of the coin carriers 176, 290 and 292. Whenever a sales price of ninety-three cents is to be established, shouldered pins 248 will be set in the second lowermost openings 250 in the plates 240 of the coin carriers 176, 290 and 292; and whenever a sales price of one dollar and twenty-four cents is to be established, shouldered pins 248 will be set in the lowermost openings 250 of the plates 240 of the coin carriers 176, 290 and 292.

In the event the desired sales price does not require the insertion of a quarter, a coin-rejecting pin of standard form will be mounted adjacent the slug rejector 50 and will be caused to extend into the quarter passageway of that slug rejector. Also, the set screw 308 will be rotated into engagement with the ear 276 on the locking lever 300 and will be rotated far enough to cause that locking lever to raise the stop 302 thereon out of the path of movement of the recesses 182 and 222 of plate 177 and gate 208 of the coin carrier 292. As a result, if a patron inserts any quarters, those quarters will be returned to him by the slug rejector 50; and he will not have to insert any quarters to free the coin carrier 292 for rotation toward the horizontal position shown by dotted lines in FIG. 5.

In the event the desired sales price does not require the insertion of a nickel, a coin-rejecting pin of standard form will be mounted adjacent the slug rejector 50 and will be caused to extend into the nickel passageway of that slug rejector. Also, the set screw 304 will be rotated into engagement with the ear 276 on the locking lever 296 and will be rotated far enough to cause that locking lever to raise the stop 298 thereon out of the path of movement of the recesses 182 and 222 of plate 177 and gate 208 of the coin carrier 290. As a result, if a patron inserts any nickels, those nickels will be returned to him by the slug rejector 50; and he will not have to insert any nickels to free the coin carrier 290 for rotation toward the horizontal position shown by dotted lines in FIG. 5.

In the event the desired sales price does not require the insertion of a penny, a coin-rejecting pin of standard form will be mounted adjacent the slug rejector 50 and will be caused to extend into the penny passageway of that slug rejector. Also, the set screw 286 will be rotated into engagement with the ear 276 on the locking lever 272 and will be rotated far enough to cause that locking lever to raise the stop 278 thereon out of the path of the recesses 182 and 222 of plate 177 and gate 208 of the coin carrier 176. As a result, if a patron inserts any pennies, those pennies will be returned to him by the slug rejector 50; and he will not have to insert any pennies to free the coin carrier 176 for rotation toward the horizontal position shown by dotted lines in FIG. 5.

As the patron rotates the handle 162, the ratchet 164 will move its uppermost tooth into engagement with the lower edge of the ear on the pawl 172. At the time the recesses 182 and 222 of the plates 177 and the gates 208 of the coin carriers engage the stops on the locking levers, that uppermost tooth will have raised the ear on the pawl 172 but that ear will be above that tooth and will thus be unable to keep the handle 162 from returning to its normal position. The return of that handle to its normal position can be effected by the patron or by the spring 168.

For purposes of illustration, it will be assumed that a sales price of sixty-nine cents is to be established. This means that the shouldered pin 248 of the coin carrier 292 will be set in the second uppermost opening 250 of the plate 240 of that coin carrier, the shouldered pin 248 of the coin carrier 290 will be set in the second lowermost opening 250 of the plate 240 of that coin carrier, and the shouldered pin 248 of the coin carrier 176 will be set in the lowermost opening 250 of the plate 240 of that coin carrier. This means that to obtain the vending of the desired product, a patron would have to insert two quarters, three nickels and four pennies. The actuating device provided by the present invention will permit vending of the desired product whenever those coins are inserted, and it will permit those coins to be inserted in any desired sequence.

It will also be assumed that the vending machine has a sufficient supply of the vendible products; and, based upon that assumption, the "empty" mechanism of the vending machine will not be engaging the pin 133. As a result, the pin 133 will be able to lie immediately adjacent the upper edge of the opening 31 in the rear wall 30 of the actuating device; and the spring 142 will be able to hold the U-shaped coin-intercepting and coin-deflecting member 132 in the solid line position shown by FIG. 5.

*Operation of Actuating Device*

If a patron attempts to initiate a vending cycle of the vending machine without inserting any coins in the coin slot of that vending machine, he will be able to rotate the handle 162 only until the recesses 182 and 222 of the coin carriers 176, 290 and 292, respectively, engage the stops 278, 298 and 302 on the locking levers 272, 296 and 300. This means that the patron will be able to rotate that handle only to the extent of about thirty degrees.

Specifically, if a patron rotates the handle 162 without inserting any coins, that rotation will cause the coin carriers 176, 290 and 292 to start rotating toward the horizontal position shown by dotted lines in FIG. 5. The convex surfaces 184 on the upper ends of the plates 177 of those coin carriers will move relative to the stops 278, 298 and 302 on the locking levers 272, 296 and 300; and the springs 284 will force those stops to follow those convex surfaces. Consequently, as the coin carriers 176, 290 and 292 continue to move toward the horizontal position shown by dotted lines in FIG. 2, the stops 278, 298 and 302 will move into register with the concave recesses 182 and 222 of the plates 177 and gates 208 of the coin carriers 176, 290 and 292; and, very quickly, those recesses will engage those stops and lock the coin carriers against further rotation toward the horizontal position shown by dotted lines in FIG. 5. In this way, the actuating device positively prevents the initiation of a vending cycle of the vending machine in the event no coins are inserted.

It should be noted, as indicated particularly by FIG. 19, that the convex surface 184 on the plate 177 of the coin carrier 176 inclines downwardly and to the left from the point of engagement between that surface and the stop 278 on the locking lever 272. Further it should be noted, as indicated by FIG. 19, that the convex surface 184 diverges downwardly from the arcuate dotted line 203 in FIG. 19. That dotted line has been scribed with the axis of the shaft 160 as its center; and hence that dotted line shows that as the stop 278 moves along the convex surface 184 toward the recesses 182 and 222 of plate 177 and gate 208 of coin carrier 176, that stop will, continuously, move radially inwardly of the plate 177. This is very desirable because it keeps that plate from applying any outwardly-directed forces to the stop 278; and it thereby makes certain that a patron can not cause the locking lever 272 to raise upwardly and carry the stops 278 thereon out of the path of movement of the recesses 182 and 222, merely by applying sudden and heavy forces to the handle 162. The showing in FIG. 19 is also representative of the relationships between the convex surfaces 184 of the plates 177 of the coin carriers 290 and 292 and the stops 298 and 302 on the locking levers 296 and 300; and hence a patron will be unable to cause any of the locking levers to raise upwardly, and carry the stops thereon out of the paths of movement of the recesses 182 and 222, merely by applying sudden and heavy forces to the handle 162.

If a patron inserts a penny in the coin slot, not shown, of the vending machine, that penny will be suitably conducted to the entrance of the slug rejector 50, will be suitably tested by that slug rejector, and will then be directed to the slot 84–106 in the coin block 70. That penny will then move downwardly through the passageway 86–108 and engage the curved portion 113 adjacent the bottom of that passageway. That curved portion will give a horizontal component of motion to that penny which will cause that penny to move toward the exit opening 118. However, that horizontal component of motion will not be great enough to cause that penny to pass to that exit opening; and, consequently, that penny will pass downwardly through the inlet end of the coin-receiving recess defined by the inner faces of the plate 177 and the gate 208 of the coin carrier 176. The tapers 195 and 197 on the rib 198 of the plate 177 will coact with the tapers 226 and 216 on the rib 214 of the gate 208 to help guide the penny into that coin-receiving recess. As that penny enters that coin-receiving recess, the central portion of that penny will be confined and guided by the cylindrical-faced ribs 198 and 214 on plate 177 and gate 208. As the penny starts to move downwardly between the ribs 198 and 214, one edge of that coin will engage the boss 200 on the plate 177 while the other edge of that coin will engage the boss 232 on the gate 208. Those bosses will coact with the ribs 198 and 214 to cause that penny to assume a position which is inclined relative to the planes defined by the plate 177 and the gate 208. The inclination of the penny relative to those planes, when that penny is in that position, is shown particularly by FIG. 24. The bosses 200 and 232 have smoothly-rounded upper faces and are thus able to cause the penny to move to the inclined position shown by FIG. 24 without halting the downward movement of that penny; and, consequently, that penny will continue to move downwardly between the ribs 198 and 214 and will move into engagement with the bosses 202 and 235. Those bosses will cause that penny to assume an inclination, relative to the planes defined by the plate 177 and the gate 208, which is opposite to the inclination which that coin assumed when it engaged the bosess 200 and 232; and that opposite inclination is shown particularly by FIG. 25. The bosses 202 and 235 have smoothly-rounded upper faces and are thus able to cause the penny to move to the inclined position shown by FIG. 25 without halting the downward movement of that penny; and, consequently, that penny will continue to move downwardly between the ribs 198 and 214 and will move into engagement with the bosses 204 and 236. Those bosses will cause the penny to assume an inclination, relative to the planes of plate 177 and gate 208, which is similar to that shown by FIG. 24. The bosses 204 and 236 have smoothly-rounded upper faces and are thus able to cause the penny to move to the inclined position shown by FIG. 24 without halting the downward movement of that penny; and, consequently, that penny will continue to move downwardly between the ribs 198 and 214 and will move into engagement with the bosses 206 and 238. Those bosses will cause the penny to assume an inclination, relative to the planes of plates 177 and 208, which is similar to that shown by FIG. 25. The bosses 206 and 238 have smoothly-rounded upper faces and will thus not halt the downward movement of the penny. However, the shouldered pin 248, which is mounted in the lowermost opening 250 of plate 240 and which extends through the lowermost opening 220 of gate 208 and extends into the lowermost socket 199 of plate 177 will intercept the penny and will hold it in engagement with the bosses 206 and 238. As a result, that penny will have an inclination, relative to the planes of plate 177 and gate 208, which is similar to the inclination shown by FIG. 25 when it comes to rest within the coin-receiving recess defined by that plate and gate.

If the patron next inserts a nickel, that nickel will be tested by the slug rejector 50 and will be directed to the slot 80–102 in the coin block 70. That nickel will then pass downwardly through the passageway 82–104 and engage the curved portion 113 adjacent the bottom of that passageway. That nickel will be caused to move toward the exit opening 116 as it engages that curved portion, but that nickel will not pass to that exit opening. Instead, that nickel will pass downwardly through the inlet end of the coin-receiving recess defined by the inner faces of the plate 177 and the gate 208 of the coin carrier 290.

The tapers 195 and 197 on the rib 207 of the plate 177 and the tapers 226 and 216 on the rib 209 of the gate 208 will help guide the nickel into that coin-receiving recess. As that nickel enters that coin-receiving recess the central portion of that nickel will be confined and guided by those ribs. As previously indicated, the ribs 207 and 209 have flat faces, the inner face of the plate 177 of the coin carrier 290 does not have bosses such as the bosses 200, 202, 204 and 206 on the plates 177 of the coin carriers 176 and 292, and the inner face of the gate 208 of the coin carrier 290 does not have bosses such as the bosses 232, 235, 236 and 238 on the gates 208 of the coin carriers 176 and 292. If desired, of course, the faces of the ribs 207 and 209 of the coin carrier 290 could be made semi-cylindrical; and, if desired, the inner faces of the plate 177 and the gate 208 of the coin carrier 290 could be equipped with bosses. However, because nickels are thick, the disposition of alternate nickels at opposite inclinations to the planes defined by the plate 177 and the gate 208 of the coin carrier 290 is unnecessary.

The inserted nickel will move downwardly between the ribs 207 and 209 until it comes to rest on the shouldered pin 248. As indicated previously, that pin is in the second lowermost opening 250 in the plate 240 of the coin carrier 290.

If the patron then inserts a quarter, that quarter will be tested by the slug rejector 50 and will be directed to the slot 76–98 in the coin block 70. That quarter will then pass downwardly through the passageway 78–100 and engage the curved portion 113 adjacent the bottom of that passageway. That quarter will be caused to move toward the exit opening 114 as it engages that curved portion, but that quarter will not pass to that exit opening. Instead, that quarter will pass downwardly through the inlet end of the coin-receiving recess defined by the inner faces of the plate 177 and the gate 208 of the coin carrier 292.

The tapers 195 and 197 on the rib 198 of the plate 177 and the tapers 226 and 216 on the rib 214 of the gate 208 of that coin carrier will help guide that quarter into that coin-receiving recess. As that quarter enters that coin-receiving recess the central portion of that quarter will be confined and guided by those ribs. As the quarter moves downwardly between the ribs 198 and 214, it will engage the bosses 200 and 232 and be caused to assume a position which is similar to the position indicated by FIG. 24. The bosses 200 and 232 have smoothly-rounded upper faces and hence they will not prevent further downward movement of the quarter. Consequently, that quarter will move down and engage the bosses 202 and 235; and those bosses will cause that quarter to assume a position which is similar to the position indicated by FIG. 25. The bosses 202 and 235 have smoothly-rounded upper faces and will not prevent further downward movement of the quarter. However, the shouldered pin 248 which is mounted in the second lowermost opening 250 in the plate 240 of the coin carrier 292 will prevent further downward movement of that quarter. As a result, the quarter will come to rest and will be held in a position similar to the position shown by FIG. 25.

If the patron next inserts a second penny, that penny will be tested by the slug rejector 50 and will be directed to the slot 84–106. That penny will then pass downwardly through the passageway 86–108, will engage and pass by the curved portion 113, and will then pass downwardly through the inlet end of the coin-receiving recess defined by the inner faces of the plate 177 and the gate 208 of the coin carrier 176.

The tapers 195, 197, 226 and 216 will help guide that penny into that coin-receiving recess; and the ribs 198 and 214 will confine and guide the central portion of that penny. The bosses 200 and 232 will cause that second penny to assume a position like that shown in FIG. 24, the bosses 202 and 235 will subsequently cause that penny to assume a position like that shown in FIG. 25, and the bosses 204 and 236 will cause that second penny to assume a position like that shown in FIG. 24. Downward movement of that second penny will be halted when that penny engages the first penny; and as that second penny comes to rest it will have an inclination which is similar to that shown in FIG. 24, while that first penny will have an inclination which is similar to that shown in FIG. 25. The resulting opposite inclinations of those pennies will make it impossible for that second penny to slip down into face-to-face relation with that first penny.

If the patron then inserts a second nickel, that nickel will be tested by the slug rejector 50 and will be directed to the slot 80–102. That nickel will then pass downwardly through the passageway 82–104, will engage and pass by the curved portion 113, and will then pass downwardly through the inlet end of the coin-receiving recess defined by the inner faces of the plate 177 and the gate 208 of the coin carrier 290. That second nickel will be guided and confined by the ribs 207 and 209 and will move downwardly between those ribs and come to rest in engagement with the first nickel.

If the patron next inserts a second quarter, that quarter will be tested by the slug rejector 50 and will be directed to the slot 76–98. That quarter will then pass downwardly through the passageway 78–100, will engage and pass by the curved portion 113, and will then pass downwardly through the inlet end of the coin-receiving recess defined by the inner faces of the plate 177 and the gate 208 of the coin carrier 292. That second quarter will engage the bosses 200 and 232, respectively, on the plate 177 and the gate 208 of the coin carrier 292, and will be caused to assume an inclination similar to that disclosed by FIG. 24. The downward movement of that second quarter will be halted when that quarter engages the first quarter; and as that second quarter comes to rest it will have an inclination which is similar to that shown by FIG. 24. The resulting opposite inclinations of those quarters will make it impossible for that second quarter to slip down into face-to-face relation with that first quarter.

At this time, the upper part of the leading edge of the quarter will extend upwardly above the arcuate surface 184 which is contiguous with the concave recess 182 of the plate 177 of the coin carrier 292. Further, the upper edge of that quarter will extend upwardly beyond the upper edge of that concave recess 182. As a result, the leading edge of that quarter will be able to act as a convex camming surface for the stop 302 on the locking lever 300. This means that when the handle 162 is rotated in the counter clockwise direction in FIG. 1, the upper portion of the leading edge of the quarter will cam the stop 302 upwardly and beyond the concave recesses 182 and 222 of the coin carrier 292. However, the handle 162 will not be able, at this time, to rotate very far because the stops 298 and 278 on the locking levers 296 and 272, respectively, will engage and be held by the concave recesses 182 and 222 of the coin carriers 290 and 176.

If the patron then inserts a third penny, that penny will be tested by the slug rejector 50 and will be directed to the slot 84–106. That penny will then pass downwardly through the passageway 86–108, will engage and pass by the curved portion 113, and will then pass downwardly through the inlet end of the coin-receiving recess defined by the inner faces of the plate 177 and the gate 208 of the coin carrier 176. The bosses 200 and 232 will cause that third penny to assume an inclination which is similar to that indicated by FIG. 24, but will permit that penny to move downwardly into engagement with the bosses 202 and 235. Those bosses will cause that penny to assume an inclination which is similar to that indicated by FIG. 25. Downward movement of that third penny will be halted when that penny engages the second penny; and at that time the first penny and the third penny will have inclinations similar to that indicated by FIG. 25 while the second penny will have an inclination similar to that indicated by FIG. 24. As a result, each penny will have an inclination which is opposite to that of each penny which it engages; and hence the upper pennies will be unable to slip down into side-by-side engagement with the lower pennies.

If the patron next inserts a third nickel, that nickel will be tested by the slug rejector 50 and will be directed to the slot 80–102. That nickel will then pass downwardly through the passageway 82–104, will engage and pass by the curved portion 113, and will then pass downwardly through the inlet end of the coin-receiving recess defined by the inner faces of the plate 177 and the gate 208 of the coin carrier 290. That third nickel will be guided and confined by the ribs 207 and 209 and will move downwardly between those ribs and come to rest in engagement with the second nickel.

At this time, the upper portion of the leading face of the third nickel will extend upwardly above the arcuate surface 184 of the plate 177 of the coin carrier 290, and the upper edge of that third nickel will extend upwardly above the upper edges of the concave recesses 182 and 222 of that coin carrier. As a result, the leading edge of the third nickel will be able to act as a convex camming surface for the stop 298 on the locking lever 296. Consequently, if the handle 162 is rotated, the third nickel will cause the stop 298 on the locking lever 296 to be raised upwardly and beyond the concave recesses 182 and 222 of the coin carrier 290. However, the handle 162 will not be able, at this time, to rotate very far because the stop 278 on the lever 272 will engage and be held by the concave recesses 182 and 222 of the coin carrier 176.

If the patron then inserts a third quarter, that quarter will be tested by the slug rejector 50 and will be directed to the slot 76–98. That quarter will then pass downwardly through the passageway 78–100 and engage the curved portion 113 adjacent the bottom of that passageway. That curved portion will give that third quarter a horizontal component of motion; and hence that quarter will be moving both laterally and downwardly as it strikes the top of the second quarter. As a result, that third quarter will bound toward and will pass through the exit opening 114. The flat face 280 on the upper part of the stop 302 will keep that stop from blocking the movement of that quarter as it moves toward that exit opening. As that quarter passes beyond the exit opening 114, it will come to rest upon, and will then roll downwardly along, the upper face of the inclined upper portion 368 of the return coin chute. That quarter will roll into the vertical portion 370 of that chute, and then fall downwardly into the inclined bottom 374. Thereafter it will be caused to pass through a suitable chute, not shown, to a coin cup at the exterior of the vending machine. The path which that third quarter will follow will be similar to the path which will be followed by an extra penny and which is indicated by the dashed line in FIG. 6.

By providing the curved portion 113, the exit opening 114, the inclined upper portion 368, and the vertical portion 370, the present invention automatically directs excess coins back to the patrons who inserted them. In this way, patrons are completely protected against the loss of any excess coins which they insert.

If the patron next inserts a fourth penny, that penny will be tested by the slug rejector 50 and will be directed to the slot 84–106. That penny will then pass downwardly through the passageway 86–108, will engage and pass by the curved portion 113, and will then pass downwardly through the inlet end of the coin-receiving recess defined by the inner faces of the plate 177 and the gate 208 of the coin carrier 176. The bosses 200 and 232 will cause that fourth penny to assume an inclination which is similar to that indicated by FIG. 24. Downward movement of that fourth penny will be halted when that penny engages the third penny; and at that time the first and third pennies will have inclinations similar to that indicated by FIG. 25 while the second and fourth pennies will have inclinations similar to that indicated by FIG. 24. As a result, the four pennies will have the alternating inclinations indicated by FIG. 26; and such inclinations will keep the upper pennies from slipping down into face-to-face engagement with the lower pennies.

At this time, the upper portion of the leading face of the fourth penny will extend upwardly above the arcuate surface 184 of the plate 177 of the coin carrier 176, as indicated by dotted lines in FIG. 9. Also, as indicated by dotted lines in FIG. 9, the upper edge of that fourth penny will extend upwardly above the upper edge of the concave recesses 182 and 222 of that coin carrier. As a result, the leading edge of that fourth penny will be able to act as a convex camming surface for the stop 278 on the locking lever 272. Consequently, if the handle 162 is rotated, the fourth penny will cause the stop 278 on the locking lever 272 to be raised upwardly and beyond the concave recesses 182 and 222 of the coin carrier 176, all as shown by FIG. 20. As that handle is rotated, the second quarter will raise the stop 302 on the locking lever 300 and the third nickel will raise the stop 298 on the locking lever 296, and hence the handle 162 will be free to rotate toward its fully rotated position.

As the uppermost penny engages the stop 278 on the locking lever 272 and as the uppermost quarter engages the stop 302 on the locking lever 300, the springs 284 will tend to hold those stops against upward movement. Consequently, if a patron applies sudden and heavy forces to the handle 162, the coin carriers 176 and 292, respectively, will have to apply appreciable forces to that penny and to that quarter. Because that penny and that quarter are, respectively, inclined relative to the planes of the plates 177 and the gates 208 of the coin carriers 176 and 292, that penny and that quarter will also be inclined relative to the stops 278 and 302. The latter inclinations will cause laterally-directed forces to be applied to that penny and to that quarter as those coins urge the stops 278 and 302 upwardly. Such laterally-directed forces will not be able to force the gates 208 to move away from the plates 177 of the coin carriers 176 and 292, and thus prematurely release the pennies and quarters, because the bosses 200 and 232 incline the leading edges of the penny and the quarter toward the plates 177 and thus away from the gates 208. Those bosses do incline the trailing edges of those coins toward the rear edges of the gates 208, but those rear edges are held against lateral movement relative to the plates 177 by the pivots 254. From the foregoing, it should be clear that by placing the bosses 200 adjacent the walls 190 on the plates 177 and by placing the bosses 232 adjacent the free edges of the gates 208, the present invention keeps the uppermost penny and the uppermost quarter from tending to cause the gates 208 to move away from the plates 177, and thereby cause premature release of the pennies and quarters, even though a patron applies sudden and heavy forces to the handle 162.

As the handle 162 rotates the coin carriers 176, 290 and 292 beyond the position where the stops 278, 298 and 302 normally intercept and hold the recesses 182 and 222 of the coin carriers 176, 290 and 292, the uppermost tooth on the ratchet 164 will move upwardly beyond the lowermost edge of the ear on the pawl 172. Thereafter, that pawl will coact with the teeth on that ratchet to permit only limited returning movement of the handle 162 until after all of the teeth on the ratchet 164 have moved upwardly beyond that edge of that ear on that pawl. This is desirable because it makes certain that once the coin carriers 176, 290 and 292 have been rotated far enough to move the concave recesses 182 and 222 thereof beyond the stops 278, 298 and 302, the handle 162 can not be moved back to its normal position until after those coin carriers have moved all the way to their fully rotated positions.

During the time the coin carriers 176, 290 and 292 are in the generally-upright, coin-receiving position shown by FIGS. 5 and 6, the walls 190 on the plates 177, the ribs 228 on the gates 208, and the inner faces of those plates and gates coact to define coin-receiving recesses that will prevent appreciable lateral movement of the coins relative to those coin carriers. Also, during that time, the shouldered pins 248 keep the coins from falling through the outlet ends of those coin carriers. The shouldered pins 248, the ribs 228, the walls 190, and the inner faces of the plates 177 and of the gates 208 will continue to confine the coins until the leaf spring 234 engage the camming edges 320 and 322 on the stationary cams 314, 326 and 328. As those leaf springs engage the camming edges 320 on the cams 314, 326 and 328, those leaf springs will be subjected to bending forces; and those bending forces will increase as those leaf springs move upwardly along those inclined camming edges. Even larger bending forces will be applied to those springs as those springs engage, and move upwardly along, the camming edges 322 on the cams 314, 326 and 328. The leaf springs 234 are quite stiff and will not yield appreciably in response to those bending forces; instead, those leaf springs will force the gates 208 to rotate about the pivots 254 and away from the plates 177. As those gates move away from the plates 177, those gates will cause the plates 240 to move with them. The overall result is that as the rounded ends of the leaf springs 234 approach the upper ends of the sharply-inclined camming edges 322, the shouldered pins 248 will have been moved well away from the inner faces of the plates 177, and the inner faces of the gates 208 will have been moved well away from the inner faces of the plates 177. Consequently, all of the coins carried by the coin carriers 176, 290 and 292 will fall downwardly through the open bottom of the actuating device and into a cash box, not shown. As indicated particularly by dotted lines in FIG. 5, the coin carriers are substantially horizontal when they are in their fully rotated positions; and this means that the opening of those coin carriers at that time will permit the coins to fall from those coin carriers in broadside fashion. In this way, prompt and effective release of all coins from the coin carriers is assured, even if some of those coins are bent or sticky. Because of the prompt and effective release of the coins from the coin carriers, a patron will be unable to trap coins in the coin carriers and cause those coins to be carried back by those coin carriers, no matter how quickly that patron tries to return the handle from its fully rotated position.

As the coin carriers reach their fully rotated position, the lowermost tooth on the ratchet 164 will move upwardly beyond the ear on the pawl 172. As that tooth so moves, it will permit the pawl 172 to return to the position shown by FIG. 5; and in that position, that pawl will permit free rotation of the ratchet 164 in the clockwise direction in FIG. 5. This means that the patron can return the handle 162 to its normal position or can release that handle and permit the spring 168 to return that handle to that position.

As the coin carriers 176, 290 and 292 move the uppermost penny, nickel and quarter beyond the stops 278, 298 and 302, respectively, the springs 284 will pull the locking levers 272, 296 and 300 downwardly. The downward movement of those locking levers will be limited by the engagement of the bends in those levers with the hubs of the plates 177 of the coin carriers 176, 290 and 292, as shown particularly by FIG. 27. At this time, the stops 278, 298 and 302 on the locking levers 272, 296 and 300 will be in the returning path of movement of the upper portions of the back edges of the plates 177 of the three coin carriers. However, as those upper portions of those back edges of those coin carriers approach those stops, those upper portions will be moving in a dominantly upward position; all as shown by the dotted arcuate line in FIG. 27. That line was scribed with the axis of the shaft 160 as a center, and thus truly shows the general path which the upper portions of the back edges of the coin carriers will follow as they engage the stops 278, 298 and 302 during the returning movement of those coin carriers. The overall result is that the returning movement of the coin carriers is not appreciably impeded by the stops 278, 298 and 302 on the locking levers 272, 296 and 300.

During the very first part of the rotation of the coin carriers from coin-accepting to coin-releasing position, the upper portions of the back edges of the plates 177 of those coin carriers will start moving away from the downwardly-depending flange 141 on the U-shaped member 138. Thereupon, the spring 144 will immediately start rotating that U-shaped member in the counter clockwise direction in FIG. 6 and thus will start rotating that U-shaped member toward the dotted-line position shown by FIG. 6. As that U-shaped member moves toward that dotted-line position, the pin 140 on the arms thereof will apply upwardly-directed forces to the under faces of the arms of the U-shaped coin-intercepting and coin-deflecting member 132 and will start shifting that intercepting and deflecting member from the solid-line position to the dotted-line position in FIG. 5. As the closed end of the coin-intercepting and coin-deflecting member 132 reaches its dotted-line position in FIG. 5, it will engage and be held by the bosses 128 and 130 on the bottom of the section 74 of the coin block 70. Thereupon, further counter clockwise rotation of the members 132 and 138 in FIG. 6 will be prevented.

At this time, the closed end of the U-shaped intercepting and deflecting member 132 will underlie the bottoms of the passageways 78–100, 82–104 and 86–108. As a result, any excess coins that may be moving downwardly through the slug rejector 50 and any coins that may subsequently be inserted by the patron, while the coin carriers are displaced from their normal positions, will be intercepted by the closed end of that U-shaped intercepting and deflecting member; and such coins will be directed into the upper portion of the return coin chute. In this way, whenever the coin carriers are moved out of their normal coin-receiving position, the present invention will promptly and effectively direct all further coins into the upper portion of the return coin chute, as by moving the closed end of the coin-intercepting and coin-deflecting member 132 into position below the bottoms of the coin passageways in the coin block 70.

When the coin carriers 176, 290 and 292 subsequently return to their normal position, the upper portions of the back edges of those coin carriers will re-engage the downwardly-depending flange 141 on the closed end of the U-shaped member 138 and will force that member into engagement with the resilient sleeves 150 on the rod 148. Those sleeves will cushion the returning movement of the U-shaped member 138 and thus of the coin carriers 176, 290 and 292. As that U-shaped member returns to its normal position, the spring 142 will return the U-shaped intercepting and deflecting member 132 to its normal position. Consequently, the member 132 will permit subsequently-inserted coins to enter the inlet ends of the coin carriers.

If, instead of rotating the handle 162 after she inserted the fourth penny, the patron were to insert a further penny or a further nickel or a further quarter, that further coin would be tested by the slug rejector 50, would be directed to the appropriate slot in the coin block 70, and would pass downwardly through the appropriate coin passageway, and would engage the curved portion 113 adjacent the lower end of that passageway. That coin would be given a horizontal component of motion by that curved portion, and that horizontal component of motion would enable that coin to bound off of the uppermost coin in the appropriate coin carrier and pass through the appropriate exit opening. That further coin would then pass downwardly through the return coin chute and be directed to the coin cup at the exterior of the vending machine. In this way, the present invention fully protects all patrons against the loss of inserted coins.

If a patron inserts one or more coins and then changes her mind, she can press the scavenging button at the exterior of the vending machine and thereby effect the return of all the coins she has inserted. Specifically, the pressing of the scavenging button at the exterior of the vending machine will apply a downward force to the roller 62 of the slug rejector 50 and thereby cause downward movement of the scavenging lever 60. That downward movement will cause the pin 66 to press the lever 352 downwardly and thereby move the connecting rod 344 and the crank arm 342 downwardly. The downward movement of that crank arm will cause the shaft 332 to rotate in the clockwise direction in FIG. 5, and will thus move the conical camming faces 336 of the cams 334, 338 and 340 down into engagement with the lips 246 of the plates 240 of the coin carriers 292, 290 and 176. As those camming faces engage those lips, they will cause the plates 240 to rotate outwardly and away from the gates 208 of those coin carriers. Such rotation of those plates will move the shanks of the shouldered pins 248 out of the coin-receiving recesses defined by the plates 177 and the gates 208 of those coin carriers. Thereupon, all of the coins held by those coin carriers will move downwardly and pass sequentially through the outlet ends of those coin carriers, and then those coins will pass through the slots 376, 378 and 389 in the lower inclined portion 372 of the return coin chute. Those coins will then pass downwardly along the inclined bottom 374 to the chute, not shown, which will conduct them to the coin cup at the exterior of the vending machine. In this way, the coins which are inserted by a patron can be returned to that patron in the event she changes her mind.

The actuating device provided by the present invention permits a patron to effect the return of the coins which she has inserted only as long as the coin carriers are in, or close to, their normal position. This is important; because it would be impractical to permit a patron to rotate the coin carriers far enough to initiate a vending cycle of the vending machine, and then let that patron use the cams 334, 338 and 340 to effect the return of the coins which that patron had inserted. The present invention keeps a patron from effecting the return of the inserted coins, after the coin carriers have been rotated far enough to initiate a vending cycle of the vending machine, by mounting those coin carriers so they rotate the lips 246 on the plates 240 thereof out of the paths of the conical camming faces 336 on the cams 334, 338 and 340 before the concave recesses 182 and 222 of those coin carriers have been moved past the stops 302, 298 and 278. This means that if a patron presses the scavenging button before the coin carriers have been rotated far enough to move the concave recesses 182 and 222 of those coin carriers past the stops 302, 298 and 278, there will be no uppermost coins in those coin carriers to raise those stops; and hence a vending cycle of the vending machine can not be initiated. On the other hand, if the patron rotates the coin carriers far enough to move the concave recesses 182 and 222 of those coin carriers past the stops 302, 298 and 278 and then presses the scavenging button, that patron will not effect the return of the coins because the lips 246 on the plates 240 of the coin carriers will have been rotated beyond the paths of movement of the conical camming faces 336 on the cams 334, 338 and 340.

The advantage of moving the lips 246 on the plates 240 beyond the paths of movement of the conical camming faces 336 on the cams 334, 338 and 340, rather than using a lock or latch to prevent rotation of those cams after the coin carriers have been moved from their normal position, is that no amount of force which is applied to the scavenging button can effect return of the inserted coins after the coin carriers have been moved. A further advantage is that full actuation of the scavenger button is always possible; and hence breakage of the scavenging lever linkage is avoided while full protection against improper returning of the coins is assured.

The cams 334, 338 and 340 perform a fuction in addition to their function of effecting the return of the inserted coins. Specifically, those cams help prevent rotation of the gates 208 away from the plates 177 of the coin carriers 176, 290 and 292 in the event a patron applies sudden and heavy forces to the handle 162. The cams 334, 338 and 340 do this by having the flat faces thereof overlying the free edges of the gates 208 whenever the coin carriers are in, or close to, their normal position. As a result, those flat faces will intercept and hold those gates if those gates tend to rotate away from the plates 177 in the event a patron applies sudden and heavy forces to the handle 162.

Referring to FIGS. 21–23, the numeral 390 generally denotes a modified form of coin carrier that is made in accordance with the principles and teachings of the present invention. That coin carrier has a plate 177 which is identical to the plate 177 of the coin carrier 290; and that plate has a longitudinally-extending rib 207 which has a flat face. The gate 208 of coin carrier 390 is identical to the gate 208 of coin carrier 290; and that gate has a flat-faced, longitudinally-extending rib 209. Coin carrier 390 has a plate 398 which is similar to the plates 240; but that plate is provided with an extension 399 which projects to the left in FIGS. 21-23. That extension is in register with the leaf spring 234 on the gate 208 of that coin carrier, and it carries a set screw 400. A locking nut 402 is threaded onto the shank of set screw to lock that set screw against rotation relative to that extension. Also, the plate 398 has ears which are longer than the ears on the plates 240 of the coin carriers 176, 290 and 292; and the plate 398 carries a shouldered pin 404 which has a longer shoulder than do the pins 248. That longer shoulder abuts the outer face of the gate 208 and holds the plate 398 farther away from the gate 208 than the shoulders of the pins 248 hold the plates 240 away from the outer faces of the gates 208.

Set screw 400 is so set, relative to extension 399, that as one of the cams 344, 338 or 340 engages the lip 246 on plate 398 and moves shouldered pin 404 out of the coin-receiving recess defined by plate 177 and gate 208 of coin carrier 390, that set screw will engage and move the leaf spring 234. That spring will then cause gate 208 to rotate away from plate 177 of coin carrier 390; and such rotation will facilitate full returning of bent or sticky coins.

To make it possible for one of the cams 334, 338 or 340 to engage and move the lip 246 on the plate 398 and yet not be struck by the gate 208 as that gate rotates away from the plate 177, the plate 398 is made with ears that are longer than the ears on the plates 240, and that cam is spaced further from that gate. Such spacing of that cam from that gate reduces the value of that cam in preventing rotation of that gate relative to the plate 177 in the event a patron applies sudden and heavy forces to the handle 162. However, by increasing the strength of the spring 256, the likelihood of such rotation is reduced.

FIGS. 21–23 show a coin carrier 390 which can be used in lieu of the coin carrier 290. If desired, coin carriers like the coin carrier 290 could be used in lieu of the coin carriers 176 and 292; but such coin carriers should be provided with cylindrical-face ribs and with bosses 200, 202, 204, 206, 232, 235, 236 and 238.

In the event the supply of product within the vending machine were to become exhausted, the "empty" mechanism of that vending machine would move the lever 133 in FIG. 1 downwardly. Such movement would force the U-shaped coin-intercepting and coin-deflecting member 132 to rotate from the solid-line position to the dotted-line position in FIG. 5; and the spring 142 would yield to permit that movement. Thereafter, until the supply of product was replenished, the closed end of that intercepting and deflecting member would direct all coins into the return coin chute. Hence, the coin-intercepting and coin-deflecting member 132 will return all further coins when the coin carriers are out of their normal position and when the vending machine is "empty."

In the drawing, three coin carriers are shown in FIG. 4; but, if desired, more or fewer coin carriers could be used. To use fewer coin carriers, it is only necessary to provide a coin-rejecting pin or coin-rejecting pins that can enable the slug rejector 50 to reject undesired coins. To use more coin carriers, a slug rejector and a coin block that can handle coins of more denominations will be required.

The plates 177 and the gates 208 of the coin carriers 176 and 292 are shown equipped with ribs 198 and 214; and such ribs are important. However, it would be possible to eliminate those ribs by making the bosses 200, 202, 204, 206, 232, 235, 236 and 238 longer in the vertical direction and by moving those bosses closer to the center lines of those coin carriers. Where the ribs 198 and 214 are eliminated, the inner faces of those bosses should closely simulate the zigzag paths of movement which coins must follow as they move downwardly through the coin-receiving recesses of those coin carriers. Further, close control of manufacturing tolerances must be provided.

Because the actuating device provided by the present invention is manually operable, the forces to which some of the parts of that device can be subjected are, necessarily, variable. Specifically, the handle 162 and the coin carriers mounted thereon can be subjected to moderate and steady forces if a patron rotates that handle firmly and at a moderate rate of speed; but that handle and those coin carriers can be subjected to heavy and sudden forces if a patron strikes that handle with the full force of the heel of the palm of his hand. This means that the handle 162, the coin carriers mounted thereon, the shaft 160, and the locking levers 272, 296 and 300 must be made quite strong. Further, it means that the coin carriers must be made so the coins will fall freely from them, despite the momentum imparted to those coins. In particular, the coin carriers must be made so the lowermost coins will fall freely from those coin carriers, as those coin carriers reach their horizontal, coin-releasing positions; and this, despite the fact that the momentum of those coins and of the coins which are resting upon those lowermost coins will tend to hold those lowermost coins in engagement with the shouldered pins. By providing the ribs 228 of the gates 208 with the cut-away portions 230, the present invention effects prompt and effective releasing of the lowermost coins from the coin carriers.

The abrupt, coin-blocking bottoms on the bosses 200, 202, 204, 206, 232, 235, 236 and 238 will keep the lower coins in the coin-receiving recesses of the coin carriers from moving toward the inlet ends of those coin carriers, as those coin carriers rotate toward coin-releasing position, even though a patron applies sudden and heavy forces to the handle 162. Further, the upper inclined portion 368 and the vertical portion 370 of the return coin chute will tend to keep the uppermost coins in those coin-receiving recesses from falling out through those inlet ends, as those coin carriers rotate toward coin-releasing position, even though a patron applies sudden and heavy forces to the handle 162.

In the foregoing description, the operation of the actuating device was described in connection with just one sales price. However, any desired sales price from one cent through one dollar and twenty-four cents can be set for the vending machine by appropriate setting of the shouldered pins 248 or 404 and, where necessary, by appropriate setting of the set screws 286, 306 and 310. Also, in the foregoing description, the coins were described as being inserted in a certain sequence. However, those coins can be inserted in random sequence.

Whereas the drawing and accompanying description have shown and described a preferred embodiment of the present invention it should be apparent to those skilled in the art that various changes can be made in the form of the invention without affecting the scope thereof.

What we claim is:

1. A money-handling device that comprises a rotatable shaft, a handle that is mounted on and that can rotate said shaft, a plurality of coin carriers that are mounted on and are rotatable with said shaft but that are spaced apart, said coin carriers normally being in a generally vertical coin-receiving position but being rotatable to a generally horizontal coin-releasing position, said coin carriers having inlet ends and outlet ends that are open, each of said coin carriers having a plurality of relatively movable members that normally coact to define a coin-receiving recess but that can be moved relative to each other to effect opening of said coin-receiving recess, a plurality of passageways that can receive coins from a slug rejector and that can direct said coins to said inlet ends of said coin carriers, said passageways having the outlet ends thereof spaced apart greater distances than the inlet ends thereof are spaced apart, said passageways having exit openings therefor that are adjacent but that are laterally displaced from said outlet ends of said passageways and having portions that direct coins, moving downwardly through said passageways, toward said exit openings, a coin-intercepting and coin-deflecting member that is selectively movable into position intermediate said outlet ends of said passageways and said inlet ends of said coin carriers to intercept coins moving toward said inlet ends of said coin carriers and to deflect said coins away from said inlet ends of said coin carriers and toward said exit openings, a return coin chute that is adjacent said exit openings and can accommodate coins passing through said exit openings, coin-supporting members that are smaller than said outlet ends of said coin carriers and that are removably disposable in said coin-receiving recesses of said coin carriers to releasably hold coins within said coin-receiving recesses while permitting dirt and other foreign matter to fall from said outlet ends of said coin carriers, openings in said return coin chute that are adjacent and are in register with said outlet ends of said coin carriers as long as said coin carriers are in or are close to said normal position and that can receive coins issuing from said outlet ends of said coin carriers when said coin-supporting members are withdrawn from said coin-receiving recesses, cams that are selectively movable relative to said coin carriers to withdraw said coin-supporting members from said coin-receiving recesses as long as said coin carriers are in or are close to said normal position, said coin carriers being movable away from the paths of movement of said cams as said coin carriers rotate from said normal position to said coin-releasing position and thereby preventing withdrawal of said coin-supporting members from said coin-receiving recesses after said coin carriers have moved appreciable distances from said normal position, locking levers that are normally disposed in register with concave recesses on said coin carriers but are movable out of registry with said concave recesses by coins that are partially within said coin-receiving recesses but have the upper portions thereof extending outwardly beyond said coin-receiving recesses and overlying said concave recesses and serving as convex camming surfaces, each of said coin carriers being adapted to accommodate a plurality of coins and said coin-supporting members being disposable at different positions relative to said coin-receiving recesses to determine the number of coins to be accommodated by said coin carriers, further cams that are adjacent said coin-releasing position of said coin carriers, said further cams responding to movement of said coin carriers toward said coin-releasing position to cause said relatively movable members to move relative to each other and thereby effect opening of said coin-receiving recesses, said coin carriers releasing, in broadside fashion, the coins held in said coin-receiving recesses as said relatively movable members move relative to each other and effect opening of said coin-receiving recesses when said coin carriers reach said coin-releasing position, said coin carriers normally causing said coin-intercepting and coin-deflecting member to remain out of register with said outlet ends of said passageways but permitting said coin-intercepting and coin-deflecting member to move into position intermediate said outlet ends of said passageways and said inlet ends of said coin carriers and to remain in position intermediate said outlet ends of said passageways and said inlet ends of said coin carriers as long as said coin carriers are out of said normal position, ribs at the inner faces of said relatively movable members of said coin carriers that can engage the central portions of said coins and thereby hold the confronting edges of contiguous coins in registry, and bosses at said inner faces of said relatively movable members of said coin carriers that can engage the leading and trailing edges of said coins and hold contiguous coins so the planes thereof are inclined relative to each other.

2. A money-handling device that comprises a plurality of coin carriers that are spaced apart and are normally in a general vertical coin-receiving position but are movable to a generally horizontal coin-releasing position, said coin carriers having inlet ends and outlet ends that are open, each of said coin carriers having a plurality of relatively movable members that normally coact to define a coin-receiving recess but that can be moved relative to each other to effect opening of said coin-receiving recess, a plurality of passageways that can receive coins and that can direct said coins to said inlet ends of said coin carriers, said passageways having the outlet ends thereof spaced apart greater distances than the inlet ends thereof are spaced apart, said passageways having exit openings therefor that are adjacent but that are laterally displaced from said outlet ends of said passageways and having portions that direct coins, moving downwardly through said passageways, toward said exit openings, a coin-intercepting and coin-deflecting member that is selectively movable into position intermediate said outlet ends of said passageways and said inlet ends of said coin carriers to intercept coins moving toward said inlet ends of said coin carriers and to deflect said coins away from said inlet ends of said coin carriers and toward said exit openings, a return coin chute that is adjacent said exit openings and can accommodate coins passing through said exit openings, coin-supporting members that are removably disposable in said coin-receiving recesses of said coin carriers to releasably hold coins within said coin-receiving recesses, openings in said return coin chute that are adjacent and are in register with said outlet ends of said coin carriers as long as said coin carriers are in or are close to said normal position and that can receive coins issuing from said outlet ends of said coin carriers when said coin-supporting members are withdrawn from said coin-receiving recesses, cams that are selectively movable relative to said coin carriers to withdraw said coin-supporting members from said coin-receiving recesses as long as said coin carriers are in or are close to said normal position, said coin carriers being movable away from the paths of movement of said cams of said coin carriers move from said normal position to said coin-releasing position and thereby preventing withdrawal of said coin-supporting members from said coin-receiving recesses after said coin carriers have moved appreciable distances from said normal position, locking levers that are normally disposed in register with recesses on said coin carriers but are movable out of registry with said recesses by coins that are partially within said coin-receiving recesses but have the upper portions thereof extending outwardly beyond said coin-receiving recesses and overlying said recesses and serving as convex camming surfaces, each of said coin carriers being adapted to accommodate a plurality of coins and said coin-supporting members being disposable at different positions relative to said coin-receiving recesses to determine the number of coins to be accommodated by said coin carriers, and further cams that are adjacent said coin-releasing position of said coin carriers, said further cams responding to movement of said coin carriers toward said coin-releasing position to cause said relatively movable members to move relative to each other and thereby effect opening of said coin-receiving recesses, said coin carriers releasing the coins held in said coin-receiving recesses as said relatively movable members move relative to each other and effect opening of said coin-receiving recesses when said coin carriers reach said coin-releasing position, said coin carriers normally causing said coin-intercepting and coin-deflecting member to remain out of register with said outlet ends of said passageways but permitting said coin-intercepting and coin-deflecting member to move into position intermediate said outlet ends of said passageways and said inlet ends of said coin carriers and to remain in position intermediate said outlet ends of said passageways and said inlet ends of said coin carriers as long as said coin carriers are out of said normal position.

3. A money-handling device that comprises a plurality of coin carriers that are normally in a generally vertical coin-receiving position but are movable to a generally horizontal coin-releasing position, said coin carriers having inlet ends and outlet ends that are open, each of said coin carriers having a plurality of relatively movable members that normally coact to define a coin-receiving recess but that can be moved relative to each other to effect opening of said coin-receiving recess, a plurality of passageways that can receive coins and that can direct said coins to said inlet ends of said coin carriers, said passageways having exit openings therefor that are adjacent but that are laterally displaced from said outlet ends of said passageways a coin-intercepting and coin-deflecting member that is selectively movable into position intermediate said outlet ends of said passageways and said inlet ends of said coin carriers to intercept coins moving toward said inlet ends of said coin carriers and to deflect said coins away from said inlet ends of said coin carriers and toward said exit openings, a return coin chute that is adjacent said exit openings and can accommodate coins passing through said exit openings, coin-supporting members that are removably disposable in said coin-receiving recesses of said coin carriers to releasably hold coins within said coin-receiving recesses, said coin return chute being adapted to receive coins issuing from said outlet ends of said coin carriers when said coin-supporting members are withdrawn from said coin-receiving recesses, cams that are selectively movable relative to said coin carriers to withdraw said coin-supporting members from said coin-receiving recesses as long as said coin carriers are in or are close to said normal position, said coin carriers being movable away from the paths of movement of said cams as said coin carriers move from said normal position to said coin-releasing position and thereby preventing withdrawal of said coin-supporting members from said coin-receiving recesses after said coin carriers have moved appreciable distances from said normal position, locking levers that are normally disposed in register with recesses on said coin carriers but are movable out of registry with said recesses by coins that are partially within said coin-receiving recesses but have the upper portions thereof extending outwardly beyond said coin-receiving recesses and overlying said recesses and serving as convex camming surfaces, each of said coin carriers being adapted to accommodate a plurality of coins and said coin-supporting members being disposable at different positions relative to said coin-receiving recesses to determine the number of coins to be accommodated by said coin carriers, and further cams that are adjacent said coin-releasing position of said coin carriers, said further cams responding to movement of said coin carriers toward said coin-releasing position to cause said relatively movable members to move relative to each other and thereby effect opening of said coin-receiving recesses, said coin carriers releasing the coins held in said coin-receiving recesses as said relatively movable members move relative to each other and effect opening of said coin-receiving recesses when said coin carriers reach said coin-releasing position, said coin carriers normally causing said coin-intercepting and coin-deflecting member to remain out of register with said outlet ends of said passageways but permitting said coin-intercepting and coin-deflecting member to move into position intermediate said outlet ends of said passageways and said inlet ends of said coin carriers and to remain in position intermediate said outlet ends of said passageways and said inlet ends of said coin carriers as long as said coin carriers are out of said normal position.

4. A money-handling device that comprises a plurality of coin carriers that are normally in a generally vertical coin-receiving position but are movable to a generally horizontally coin-releasing position, each of said coin carriers having a plurality of relatively movable members that normally coact to define a coin-receiving recess but that can be moved relative to each other to effect opening of said coin-receiving recess, locking levers that are normally disposed in register with concave recesses on said coin carriers but are movable out of registry with said concave recesses by coins that are partially within said coin-receiving recesses but have the upper portions thereof extending outwardly beyond said coin-receiving recesses and overlying said concave recesses and serving as convex camming surfaces, and cams that are adjacent said coin-releasing position of said coin carriers, said cams responding to movement of said coin carriers toward said coin-releasing position to cause said relatively movable members to move relative to each other and thereby effect opening of said coin-receiving recesses, said coin carriers releasing, in broadside fashion, the coins held in said coin-receiving recesses as said relatively movable members move relative to each other and effect opening of said coin-receiving recesses when said coin carriers reach said coin-releasing position.

5. A money-handling device that comprises a coin carrier, a mounting for said coin carrier that permits movement of said coin carrier, spaced faces on said coin carrier that coact to define a coin-receiving recess, and surfaces on said faces that can engage inserted coins and hold contiguous coins so the planes of said coins are inclined relative to each other, said surfaces being discontinuous and being staggered to cause coins entering coin-receiving recess to move in zigzag fashion, said coin carrier being movable to apply upwardly-directed forces to the coins held therein, said surfaces having smoothly-rounded upper faces and having abrupt coin-blocking lower faces so coins can freely move downwardly past said surfaces but said upwardly-directed forces cannot move coins upwardly past said surfaces.

6. A money-handling device which comprises a coin carrier, a mounting for said carrier that permits said carrier to move from a generally vertical coin-receiving position to a generally horizontal coin-releasing position, and a member which coacts with said coin carrier to cause said coin carrier to release the coins held thereby as said coin carrier approaches said horizontal position and to enable said coins to fall, in broadside fashion, from said coin carrier.

7. A money-handling device that comprises a coin carrier, a mounting for said coin carrier that permits said coin carrier to move from a coin-receiving position to a coin-releasing position, said coin carrier having relatively movable members that are normally disposed adjacent each other to define a coin-receiving recess but that are movable away from each other to permit coins held in said coin-receiving recess to fall from said coin carrier, and an element that coacts with said coin carrier as said coin carrier approaches said coin-releasing position to cause said relatively movable members to move away from each other and thereby permit coins held in said coin-receiving recess to fall from said coin carrier in broadside fashion.

8. A money-handling device that comprises a coin carrier, a mounting for said coin carrier that permits said coin carrier to move from a coin-receiving position to a coin-releasing position, said coin carrier having relatively movable members that are normally disposed adjacent each other to define a coin-receiving recess but that are movable away from each other to permit coins held in said coin-receiving recess to fall from said coin carrier, and an element that coacts with said coin carrier as said coin carrier approaches said coin-releasing position to cause said relatively movable members to move away from each other and thereby permit coins held in said coin-receiving recess to fall from said coin carrier in broadside fashion, said element being a cam which has a slightly-inclined camming portion and which has a sharply-inclined camming portion, said slightly-inclined camming portion and said sharply-inclined camming portion providing increasingly rapid movement of said relatively movable members of said coin carrier away from each other.

9. A money-handling device that comprises a coin carrier, a mounting for said coin carrier that permits said coin carrier to move from a coin-receiving position to a coin-releasing position, said coin carrier having relatively movable members that are normally disposed adjacent each other to define a coin-receiving recess but that are movable away from each other to permit coins held in said coin-receiving recess to fall from said coin carrier, and an element that coacts with said coin carrier as said coin carrier approaches said coin-releasing position to cause said relatively movable members to move away from each other and thereby permit coins held in said coin-receiving recess to fall from said coin carrier in broadside fashion, one of said relatively movable members of said coin carrier having a yieldable member that is engageable with said element as said coin carrier approaches said coin-releasing position, said yieldable member cushioning shock that otherwise would be imparted to said coin carrier.

10. A money-handling device which comprises a coin carrier that is normally disposable in a coin-receiving position but is movable to a coin-releasing position, said coin carrier having a coin-receiving recess therein, a locking lever that is mounted adjacent said coin-receiving position of said coin carrier, a surface on said coin carrier that is adjacent said coin-receiving recess and that responds to movement of said coin carrier away from ing lever that is mounted adjacent said coin-receiving recess is empty, to engage said locking lever and thereby prevent movement of said coin carrier toward said coin-releasing position, said locking lever being held out of engagement with said surface on said coin carrier and thereby permitting said coin carrier to be moved toward said coin-releasing position whenever a predetermined number of coins is disposed within said coin-receiving recess in said coin carrier and thereby causes one of said coins to be interposed between said locking lever and said surface on said coin carrier, said locking lever normally resting on a portion of said coin carrier which is close to but below the level of the upper edge of said one coin, whereby said locking lever is normally in the path of said one coin but said one coin does not have to move said stop an appreciable distance to dispose said stop at said level.

11. In a money-handling device which has a coin carrier with a coin-receiving recess therein, a coin-intercepting and coin-deflecting member that is mounted adjacent the inlet end of said coin-receiving recess of said coin carrier, said coin-intercepting and coin-deflecting member being disposable out of register with said inlet end of said coin-receiving recess of said coin carrier to permit coins to enter said inlet end of said coin-receiving recess of said coin carrier but being movable into register with said inlet end of said coin-receiving recess of said coin carrier to block said inlet end of said coin-receiving recess of said coin carrier and to intercept coins moving toward said inlet end of said coin-receiving recess and deflect such coins toward a return coin chute, said coin-intercepting and coin-deflecting member being spaced from said inlet end of said carrier a distance less than the diameter of one of said coins whenever said coin-intercepting and coin-deflecting member is in blocking position, said coin-intercepting and coin-deflecting member moving toward said return coin chute as it moves toward blocking position and acting, when it engages a coin as it moves into blocking position, to move said coin toward said return coin chute, and an actuating member that responds to said coin carrier whenever said coin carrier is in its normal position to hold said coin-intercepting and coin-deflecting member out of register with said inlet end of said coin-receiving recess of said coin carrier, said actuating member permitting said coin-intercepting and coin-deflecting member to move into coin-intercepting and coin-deflecting position as said coin carrier moves out of its normal position and moves toward coin-releasing position.

12. A money-handling device which has a coin carrier, a pivot for said coin carrier, said coin carrier having relatively movable walls that define a coin-receiving recess but that are movable relative to each other to open said coin-receiving recess, and a coin-supporting member that extends into said coin-receiving recess and can support a coin within said coin-receiving recess, a portion of one of said relatively movable walls being cut away adjacent said coin-supporting member, said one wall being directed transversely of said pivot, said coin carrier being rotatable about said pivot to develop momentum, in coins held therein, which will urge said coins toward said coin-supporting member and said one wall as said coin carrier slows down when it approaches coin releasing position, said cut away portions of said one wall enabling coins to fall from said coin-receiving recess as said walls are moved relative to each other despite the momentum of said coins as said coin carrier approaches coin-releasing position.

13. A money-handling device which has a coin carrier, a pivot for said coin carrier, said coin carrier having relatively movable walls that define a coin-receiving recess but that are movable relative to each other to open said coin-receiving recess, and a coin-supporting member that extends into said coin-receiving recess and can support a coin within said coin-receiving recess, a portion of one of said relatively movable walls being cut away adjacent said coin-supporting member, said one wall being directed transversely of said pivot, said coin carrier being rotatable about said pivot to develop momentum, in coins held therein, which will urge said coins toward said coin-supporting member and said one wall as said coin carrier slows down when it approaches coin releasing position, said cut away portions of said one wall enabling coins to fall from said coin-receiving recess as said walls are moved relative to each other despite the momentum of said coins as said coin carrier approaches coin-releasing position, said cut away portion being in a flange at one edge of said one relatively movable wall and extending to the adjacent end of said one relatively movable wall.

14. A money-handling device which comprises a coin carrier with a first member, a second member that is normally disposed adjacent said first member to define a coin-receiving recess but is movable away from said first member to open said coin-receiving recess and thereby permit the coins held in said coin-receiving recess to fall from said coin-receiving recess, surfaces at the interior of said coin-receiving recess that hold said coins inclined relative to said first said member, and a locking element that responds to relative movement between itself and a coin that is partially within and partially extending out of said coin-receiving recess to unlock said coin carrier, said surfaces causing said coin to have its leading edge inclined toward said first member and away from said second member so forces applied to said coin by said locking element can not cause said coin to move said second member away from said first member.

15. A money-handling device which comprises a rotatable coin carrier with a plate, a pivot carried by said plate, a gate carried by said pivot, said gate normally being disposed adjacent said plate to define a coin-receiving recess but being rotatable about said pivot to move away from said plate and thereby open said coin-receiving recess and permit the coins held in said coin-receiving recess to fall from said coin-receiving recess, bosses at the inner faces of said plate and gate that hold the uppermost coin in said coin-receiving recess so its leading edge is inclined toward said plate and is inclined away from said gate, whereby forces applied to said coin can not cause said coin to move said gate away from said plate.

16. A money-handling device which comprises a coin carrier that normally is in a generally vertical coin-receiving position but is movable to a generally horizontal coin-releasing position, said coin carrier having a plurality of relatively movable members that normally coact to define a coin-receiving recess but that can be moved relative to each other to effect opening of said coin-receiving recess, and an element that responds to movement of said coin carrier to coin-releasing position to cause said relatively movable members to move relative to each other and thereby effect opening of said coin-receiving recess, said coin carrier releasing, in broadside fashion, the coins held in said coin-receiving recess as said relatively movable members move relative to each other and effect opening of said coin-receiving recess when said coin carrier reaches said coin-releasing position.

17. A money-handling device that comprises a coin carrier which has a plate and a gate that normally coact to define a coin-receiving recess, said gate being movable relative to said plate to open said coin-receiving recess, a coin-supporting member that is removably disposable in said coin-receiving recess of said coin carrier to releasably hold coins within said coin-receiving recess, and a cam that is selectively movable relative to said coin carrier to withdraw said coin-supporting member from said coin-receiving recess while simultaneously limiting movement of said gate away from said plate, whereby said gate and said plate can keep coins within said coin-receiving recess from shingling or cocking within said recess.

18. In a money-handling device which has a coin carrier with a coin-receiving recess therein, a coin-intercepting and coin-deflecting member that is mounted adjacent the inlet end of said coin-receiving recess of said coin carrier, said coin-intercepting and coin-deflecting member normally being disposed out of register with said inlet end of said coin-receiving recess of said coin carrier but being movable into register with said inlet end of said coin-receiving recess of said coin carrier to block said inlet end of said coin-receiving recess of said coin carrier and to intercept coins moving toward said inlet end of said coin-receiving recess and deflect such coins toward a return coin chute, said coin-intercepting and coin-deflecting member being movable into register with said inlet end of said coin-receiving recess of said coin carrier when said coin carrier moves out of its normal position and when the vending machine, with which said money-handling device is used, becomes empty.

References Cited in the file of this patent

UNITED STATES PATENTS

| | | |
|---|---|---|
| 687,008 | Foss | Nov. 19, 1901 |
| 764,548 | Baughman | July 12, 1904 |
| 1,038,136 | Hibberd | Sept. 10, 1912 |
| 1,067,669 | Miller | July 15, 1913 |
| 1,454,272 | Ezell | May 8, 1923 |
| 1,579,163 | Stewart | Mar. 30, 1926 |
| 1,628,062 | Petersen | May 10, 1927 |
| 1,731,352 | Schermack | Oct. 15, 1929 |
| 1,782,666 | Ross | Nov. 25, 1930 |
| 1,786,014 | Hochriem | Dec. 23, 1930 |
| 1,788,523 | Jennings et al. | Jan. 13, 1931 |
| 1,983,073 | DuGrenier | Dec. 4, 1934 |
| 2,037,462 | DuGrenier | Apr. 14, 1936 |
| 2,040,983 | DuGrenier | May 19, 1936 |
| 2,083,928 | Steiner | June 15, 1937 |
| 2,132,804 | Richardson | Oct. 11, 1938 |
| 2,247,888 | Neidig | July 1, 1941 |
| 2,549,168 | Brundage | Apr. 17, 1951 |
| 2,666,514 | Stewart | Jan. 19, 1954 |
| 2,916,126 | Shipman | Dec. 8, 1959 |
| 2,925,898 | Terry | Feb. 23, 1960 |

FOREIGN PATENTS

| | | |
|---|---|---|
| 35,159 | Netherlands | Apr. 15, 1935 |
| 676,140 | Germany | May 26, 1939 |